US011076054B2

(12) United States Patent
Chaudhary et al.

(10) Patent No.: US 11,076,054 B2
(45) Date of Patent: Jul. 27, 2021

(54) SYSTEM AND METHOD FOR PROGRAMMATIC DEVICE CONNECTIVITY

(71) Applicant: Twilio Inc., San Francisco, CA (US)

(72) Inventors: Chetan Chaudhary, San Francisco, CA (US); Evan Cummack, San Francisco, CA (US); Brian Tarricone, San Francisco, CA (US)

(73) Assignee: Twilio Inc., San Francisco, CA (US)

( * ) Notice: Subject to any disclaimer, the term of this patent is extended or adjusted under 35 U.S.C. 154(b) by 0 days.

(21) Appl. No.: 16/915,754

(22) Filed: Jun. 29, 2020

(65) Prior Publication Data

US 2020/0329157 A1 Oct. 15, 2020

Related U.S. Application Data

(63) Continuation of application No. 16/545,985, filed on Aug. 20, 2019, now abandoned, which is a
(Continued)

(51) Int. Cl.
*H04W 4/50* (2018.01)
*H04M 15/00* (2006.01)
(Continued)

(52) U.S. Cl.
CPC ....... *H04M 15/887* (2013.01); *H04M 15/715* (2013.01); *H04W 4/14* (2013.01);
(Continued)

(58) Field of Classification Search
CPC .............. H04M 15/715; H04M 15/887; H04M 2215/54; H04M 15/58; H04M 15/41;
(Continued)

(56) References Cited

U.S. PATENT DOCUMENTS 5,274,700 A 12/1993 Gechter et al.
5,526,416 A 6/1996 Dezonno et al.
(Continued)

FOREIGN PATENT DOCUMENTS

DE 1684587 A1 3/1971
EP 0282126 A2 9/1988
(Continued)

OTHER PUBLICATIONS

"Aepona's API Monetization Platform Wins Best of 4G Awards for Mobile Cloud Enabler", 4G World 2012 Conference & Expo, [Online]. [Accessed Nov. 5, 2015]. Retrieved from the Internet: <URL: https://www.realwire.com/releases/%20Aeponas-API-Monetization>, (Oct. 30, 2012), 4 pgs.
(Continued)

*Primary Examiner* — Nathan S Taylor
(74) *Attorney, Agent, or Firm* — Schwegman Lundberg & Woessner, P.A.

(57) ABSTRACT

A system and method for programmatically managing device connectivity to a network that includes provisioning connectivity devices with an account of a communication platform, where for a set of the connectivity devices, provisioning includes uniquely associating network operating identifiers of each of the connectivity devices with a corresponding programmatic device resource in the communication platform, setting communication metering properties in a programmatic connectivity plan resource in the communication platform and associating the connectivity plan resource to at least a subset of the device resources of the connectivity devices, and activating network communication status of the connectivity devices; servicing communications from the connectivity devices; and programmatically managing the communications from the connectivity
(Continued)

devices through at least the device resources and the connectivity plan resources.

16 Claims, 10 Drawing Sheets

Related U.S. Application Data continuation of application No. 16/042,823, filed on Jul. 23, 2018, now Pat. No. 10,440,192, which is a continuation of application No. 15/602,809, filed on May 23, 2017, now Pat. No. 10,063,713.

(60) Provisional application No. 62/340,333, filed on May 23, 2016.

(51) Int. Cl.
*H04W 4/14* (2009.01)
*H04W 8/26* (2009.01)

(52) U.S. Cl.
CPC ............ *H04W 4/50* (2018.02); *H04W 8/265* (2013.01); *H04M 2215/54* (2013.01)

(58) Field of Classification Search
CPC ...... H04M 15/43; H04M 15/51; H04M 15/52; H04M 15/60; H04M 15/70; H04M 15/80; H04M 15/8016; H04M 15/8022; H04M 1/72519; H04M 1/72561; H04M 3/42221; H04M 15/28; H04M 15/30; H04M 15/55; H04M 15/61; H04W 4/001; H04W 4/14; H04W 8/265; H04W 48/02; H04W 12/06; H04W 4/24; H04W 12/02; H04W 12/08; H04W 48/16; H04W 4/50; H04W 4/60; H04W 60/00; H04W 74/004; H04W 76/00; H04W 76/30; H04W 8/24; H04W 8/26; H04W 12/12; H04W 4/20; H04W 4/26; G06F 3/0482; H04L 12/1403; H04L 12/1432; H04L 12/1442; H04L 12/1485; H04L 41/0806; H04L 41/5061; H04L 63/101; H04L 63/30; H04L 67/02; H04L 67/20; H04L 12/141; H04L 12/1414; H04L 12/1435; H04L 12/1439; H04L 12/1467; H04L 67/306
USPC ................... 455/405–406, 433–434
See application file for complete search history.

(56) References Cited

U.S. PATENT DOCUMENTS

| | | | |
|---|---|---|---|
| 5,581,608 A | 12/1996 | Jreij et al. |
| 5,598,457 A | 1/1997 | Foladare et al. |
| 5,867,495 A | 2/1999 | Elliott et al. |
| 5,934,181 A | 8/1999 | Adamczewski |
| 5,978,465 A | 11/1999 | Corduroy et al. |
| 6,026,440 A | 2/2000 | Shrader et al. |
| 6,034,946 A | 3/2000 | Roginsky et al. |
| 6,094,681 A | 7/2000 | Shaffer et al. |
| 6,138,143 A | 10/2000 | Gigliotti et al. |
| 6,185,565 B1 | 2/2001 | Meubus et al. |
| 6,192,123 B1 | 2/2001 | Grunsted et al. |
| 6,206,564 B1 | 3/2001 | Adamczewski |
| 6,223,287 B1 | 4/2001 | Douglas et al. |
| 6,232,979 B1 | 5/2001 | Shochet |
| 6,269,336 B1 | 7/2001 | Ladd et al. |
| 6,317,137 B1 | 11/2001 | Rosasco |
| 6,363,065 B1 | 3/2002 | Thornton et al. |
| 6,373,836 B1 | 4/2002 | Deryugin et al. |
| 6,425,012 B1 | 7/2002 | Trovato et al. |
| 6,426,995 B1 | 7/2002 | Kim et al. |
| 6,430,175 B1 | 8/2002 | Echols et al. |
| 6,434,528 B1 | 8/2002 | Sanders |
| 6,445,694 B1 | 9/2002 | Swartz |
| 6,445,776 B1 | 9/2002 | Shank et al. |
| 6,459,913 B2 | 10/2002 | Cloutier |
| 6,463,414 B1 | 10/2002 | Su et al. |
| 6,493,558 B1 | 12/2002 | Bernhart et al. |
| 6,496,500 B2 | 12/2002 | Nance et al. |
| 6,501,739 B1 | 12/2002 | Cohen |
| 6,501,832 B1 | 12/2002 | Saylor et al. |
| 6,507,875 B1 | 1/2003 | Mellen-Garnett et al. |
| 6,571,245 B2 | 5/2003 | Huang et al. |
| 6,574,216 B1 | 6/2003 | Farris et al. |
| 6,577,721 B1 | 6/2003 | Vainio et al. |
| 6,600,736 B1 | 7/2003 | Ball et al. |
| 6,606,596 B1 | 8/2003 | Zirngibl et al. |
| 6,614,783 B1 | 9/2003 | Sonesh et al. |
| 6,625,258 B1 | 9/2003 | Ram et al. |
| 6,625,576 B2 | 9/2003 | Kochanski et al. |
| 6,636,504 B1 | 10/2003 | Albers et al. |
| 6,662,231 B1 | 12/2003 | Drosset et al. |
| 6,704,785 B1 | 3/2004 | Koo et al. |
| 6,707,889 B1 | 3/2004 | Saylor et al. |
| 6,711,129 B1 | 3/2004 | Bauer et al. |
| 6,711,249 B2 | 3/2004 | Weissman et al. |
| 6,738,738 B2 | 5/2004 | Henton |
| 6,757,365 B1 | 6/2004 | Bogard |
| 6,765,997 B1 | 7/2004 | Zirngibl et al. |
| 6,768,788 B1 | 7/2004 | Langseth et al. |
| 6,771,955 B2 | 8/2004 | Imura et al. |
| 6,778,653 B1 | 8/2004 | Kallas et al. |
| 6,785,266 B2 | 8/2004 | Swartz |
| 6,788,768 B1 | 9/2004 | Saylor et al. |
| 6,792,086 B1 | 9/2004 | Saylor et al. |
| 6,792,093 B2 | 9/2004 | Barak et al. |
| 6,798,867 B1 | 9/2004 | Zirngibl et al. |
| 6,807,529 B2 | 10/2004 | Johnson et al. |
| 6,807,574 B1 | 10/2004 | Partovi et al. |
| 6,819,667 B1 | 11/2004 | Brusilovsky et al. |
| 6,820,260 B1 | 11/2004 | Flockhart et al. |
| 6,829,334 B1 | 12/2004 | Zirngibl et al. |
| 6,831,966 B1 | 12/2004 | Tegan et al. |
| 6,834,265 B2 | 12/2004 | Balasuriya |
| 6,836,537 B1 | 12/2004 | Zirngibl et al. |
| 6,842,767 B1 | 1/2005 | Partovi et al. |
| 6,850,603 B1 | 2/2005 | Eberle et al. |
| 6,870,830 B1 | 3/2005 | Schuster et al. |
| 6,873,952 B1 | 3/2005 | Bailey et al. |
| 6,874,084 B1 | 3/2005 | Dobner et al. |
| 6,885,737 B1 | 4/2005 | Gao et al. |
| 6,888,929 B1 | 5/2005 | Saylor et al. |
| 6,895,084 B1 | 5/2005 | Saylor et al. |
| 6,898,567 B2 | 5/2005 | Balasuriya |
| 6,912,581 B2 | 6/2005 | Johnson et al. |
| 6,922,411 B1 | 7/2005 | Taylor |
| 6,928,469 B1 | 8/2005 | Duursma et al. |
| 6,931,405 B2 | 8/2005 | El-shimi et al. |
| 6,937,699 B1 | 8/2005 | Schuster et al. |
| 6,940,953 B1 | 9/2005 | Eberle et al. |
| 6,941,268 B2 | 9/2005 | Porter et al. |
| 6,947,417 B2 | 9/2005 | Laursen et al. |
| 6,947,988 B1 | 9/2005 | Saleh et al. |
| 6,961,330 B1 | 11/2005 | Cattan et al. |
| 6,964,012 B1 | 11/2005 | Zirngibl et al. |
| 6,970,915 B1 | 11/2005 | Partovi et al. |
| 6,977,992 B2 | 12/2005 | Zirngibl et al. |
| 6,981,041 B2 | 12/2005 | Araujo et al. |
| 6,985,862 B2 | 1/2006 | Strom et al. |
| 6,999,576 B2 | 2/2006 | Sacra |
| 7,003,464 B2 | 2/2006 | Ferrans et al. |
| 7,006,606 B1 | 2/2006 | Cohen et al. |
| 7,010,586 B1 | 3/2006 | Allavarpu et al. |
| 7,020,685 B1 | 3/2006 | Chen et al. |
| 7,039,165 B1 | 5/2006 | Saylor et al. |
| 7,058,042 B2 | 6/2006 | Bontempi et al. |
| 7,062,709 B2 | 6/2006 | Cheung |
| 7,065,637 B1 | 6/2006 | Nanja |
| 7,076,037 B1 | 7/2006 | Gonen et al. |
| 7,076,428 B2 | 7/2006 | Anastasakos et al. |

(56) References Cited

U.S. PATENT DOCUMENTS

| | | |
|---|---|---|
| 7,089,310 B1 | 8/2006 | Ellerman et al. |
| 7,103,003 B2 | 9/2006 | Brueckheimer et al. |
| 7,103,171 B1 | 9/2006 | Annadata et al. |
| 7,106,844 B1 | 9/2006 | Holland |
| 7,111,163 B1 | 9/2006 | Haney |
| 7,136,932 B1 | 11/2006 | Schneider |
| 7,140,004 B1 | 11/2006 | Kunins et al. |
| 7,143,039 B1 | 11/2006 | Stifelman et al. |
| 7,197,331 B2 | 3/2007 | Anastasakos et al. |
| 7,197,461 B1 | 3/2007 | Eberle et al. |
| 7,197,462 B2 | 3/2007 | Takagi et al. |
| 7,197,544 B2 | 3/2007 | Wang et al. |
| 7,225,232 B2 | 5/2007 | Elberse |
| 7,227,849 B1 | 6/2007 | Rasanen |
| 7,245,611 B2 | 7/2007 | Narasimhan et al. |
| 7,260,208 B2 | 8/2007 | Cavalcanti |
| 7,266,181 B1 | 9/2007 | Zirngibl et al. |
| 7,269,557 B1 | 9/2007 | Bailey et al. |
| 7,272,212 B2 | 9/2007 | Eberle et al. |
| 7,272,564 B2 | 9/2007 | Phillips et al. |
| 7,277,851 B1 | 10/2007 | Henton |
| 7,283,515 B2 | 10/2007 | Fowler |
| 7,286,521 B1 | 10/2007 | Jackson et al. |
| 7,287,248 B1 | 10/2007 | Adeeb |
| 7,289,453 B2 | 10/2007 | Riedel et al. |
| 7,296,739 B1 | 11/2007 | Mo et al. |
| 7,298,732 B2 | 11/2007 | Cho |
| 7,298,834 B1 | 11/2007 | Homeier et al. |
| 7,308,085 B2 | 12/2007 | Weissman |
| 7,308,408 B1 | 12/2007 | Stifelman et al. |
| 7,324,633 B2 | 1/2008 | Gao et al. |
| 7,324,942 B1 | 1/2008 | Mahowald et al. |
| 7,328,263 B1 | 2/2008 | Sadjadi |
| 7,330,463 B1 | 2/2008 | Bradd et al. |
| 7,330,890 B1 | 2/2008 | Partovi et al. |
| 7,340,040 B1 | 3/2008 | Saylor et al. |
| 7,349,714 B2 | 3/2008 | Lee et al. |
| 7,369,865 B2 | 5/2008 | Gabriel et al. |
| 7,373,660 B1 | 5/2008 | Guichard et al. |
| 7,376,223 B2 | 5/2008 | Taylor et al. |
| 7,376,586 B1 | 5/2008 | Partovi et al. |
| 7,376,733 B2 | 5/2008 | Connelly et al. |
| 7,376,740 B1 | 5/2008 | Porter et al. |
| 7,412,525 B2 | 8/2008 | Cafarella et al. |
| 7,418,090 B2 | 8/2008 | Reding et al. |
| 7,428,302 B2 | 9/2008 | Zirngibl et al. |
| 7,440,898 B1 | 10/2008 | Eberle et al. |
| 7,447,299 B1 | 11/2008 | Partovi et al. |
| 7,454,459 B1 | 11/2008 | Kapoor et al. |
| 7,457,249 B2 | 11/2008 | Baldwin et al. |
| 7,457,397 B1 | 11/2008 | Saylor et al. |
| 7,473,872 B2 | 1/2009 | Takimoto |
| 7,486,780 B2 | 2/2009 | Zirngibl et al. |
| 7,496,054 B2 | 2/2009 | Taylor |
| 7,496,188 B2 | 2/2009 | Saha et al. |
| 7,496,651 B1 | 2/2009 | Joshi |
| 7,500,249 B2 | 3/2009 | Kampe et al. |
| 7,505,951 B2 | 3/2009 | Thompson et al. |
| 7,519,359 B2 | 4/2009 | Chiarulli et al. |
| 7,522,711 B1 | 4/2009 | Stein et al. |
| 7,536,454 B2 | 5/2009 | Balasuriya |
| 7,542,761 B2 | 6/2009 | Sarkar |
| 7,552,054 B1 | 6/2009 | Stifelman et al. |
| 7,571,226 B1 | 8/2009 | Partovi et al. |
| 7,606,868 B1 | 10/2009 | Le et al. |
| 7,613,287 B1 | 11/2009 | Stifelman et al. |
| 7,623,648 B1 | 11/2009 | Oppenheim et al. |
| 7,630,900 B1 | 12/2009 | Strom |
| 7,631,310 B1 | 12/2009 | Henzinger |
| 7,644,000 B1 | 1/2010 | Strom |
| 7,657,433 B1 | 2/2010 | Chang |
| 7,657,434 B2 | 2/2010 | Thompson et al. |
| 7,668,157 B2 | 2/2010 | Weintraub et al. |
| 7,672,275 B2 | 3/2010 | Yajnik et al. |
| 7,672,295 B1 | 3/2010 | Andhare et al. |
| 7,675,857 B1 | 3/2010 | Chesson |
| 7,676,221 B2 | 3/2010 | Roundtree et al. |
| 7,685,280 B2 | 3/2010 | Berry et al. |
| 7,685,298 B2 | 3/2010 | Day et al. |
| 7,715,547 B2 | 5/2010 | Ibbotson et al. |
| 7,716,293 B2 | 5/2010 | Kasuga et al. |
| 7,742,499 B1 | 6/2010 | Erskine et al. |
| 7,779,065 B2 | 8/2010 | Gupta et al. |
| 7,809,125 B2 | 10/2010 | Brunson et al. |
| 7,875,836 B2 | 1/2011 | Imura et al. |
| 7,882,253 B2 | 2/2011 | Pardo-Castellote et al. |
| 7,920,866 B2 | 4/2011 | Bosch et al. |
| 7,926,099 B1 | 4/2011 | Chakravarty et al. |
| 7,929,562 B2 | 4/2011 | Petrovykh |
| 7,936,867 B1 | 5/2011 | Hill et al. |
| 7,949,111 B2 | 5/2011 | Harlow et al. |
| 7,962,644 B1 | 6/2011 | Ezerzer et al. |
| 7,979,555 B2 | 7/2011 | Rothstein et al. |
| 7,992,120 B1 | 8/2011 | Wang et al. |
| 8,023,425 B2 | 9/2011 | Raleigh |
| 8,024,785 B2 | 9/2011 | Andress et al. |
| 8,045,689 B2 | 10/2011 | Provenzale et al. |
| 8,046,378 B1 | 10/2011 | Zhuge et al. |
| 8,046,823 B1 | 10/2011 | Begen et al. |
| 8,069,096 B1 | 11/2011 | Ballaro et al. |
| 8,078,483 B1 | 12/2011 | Hirose et al. |
| 8,081,744 B2 | 12/2011 | Sylvain |
| 8,081,958 B2 | 12/2011 | Soderstrom et al. |
| 8,103,725 B2 | 1/2012 | Gupta et al. |
| 8,126,128 B1 | 2/2012 | Hicks, III et al. |
| 8,126,129 B1 | 2/2012 | Mcguire |
| 8,130,750 B2 | 3/2012 | Hester |
| 8,139,730 B2 | 3/2012 | Da Palma et al. |
| 8,149,716 B2 | 4/2012 | Ramanathan et al. |
| 8,150,918 B1 | 4/2012 | Edelman et al. |
| 8,156,213 B1 | 4/2012 | Deng et al. |
| 8,165,116 B2 | 4/2012 | Ku et al. |
| 8,166,185 B2 | 4/2012 | Samuel et al. |
| 8,169,936 B2 | 5/2012 | Koren et al. |
| 8,175,007 B2 | 5/2012 | Jain et al. |
| 8,185,619 B1 | 5/2012 | Maiocco et al. |
| 8,196,133 B2 | 6/2012 | Kakumani et al. |
| 8,204,479 B2 | 6/2012 | Vendrow et al. |
| 8,214,868 B2 | 7/2012 | Hamilton et al. |
| 8,233,611 B1 | 7/2012 | Zettner |
| 8,238,533 B2 | 8/2012 | Blackwell et al. |
| 8,243,889 B2 | 8/2012 | Taylor et al. |
| 8,249,552 B1 | 8/2012 | Gailloux et al. |
| 8,266,327 B2 | 9/2012 | Kumar et al. |
| 8,295,272 B2 | 10/2012 | Boni et al. |
| 8,306,021 B2 | 11/2012 | Lawson et al. |
| 8,315,198 B2 | 11/2012 | Corneille et al. |
| 8,315,620 B1 * | 11/2012 | Williamson ............ H04W 4/50 455/418 |
| 8,319,816 B1 | 11/2012 | Swanson et al. |
| 8,326,805 B1 | 12/2012 | Arous et al. |
| 8,346,630 B1 | 1/2013 | Mckeown |
| 8,355,394 B2 | 1/2013 | Taylor et al. |
| 8,413,247 B2 | 4/2013 | Hudis et al. |
| 8,417,817 B1 | 4/2013 | Jacobs |
| 8,429,827 B1 | 4/2013 | Wetzel |
| 8,438,315 B1 | 5/2013 | Tao et al. |
| 8,462,670 B2 | 6/2013 | Chien |
| 8,467,502 B2 | 6/2013 | Sureka et al. |
| 8,477,926 B2 | 7/2013 | Jasper et al. |
| 8,503,639 B2 | 8/2013 | Reding et al. |
| 8,503,650 B2 | 8/2013 | Reding et al. |
| 8,509,068 B2 | 8/2013 | Begall et al. |
| 8,509,767 B2 * | 8/2013 | Parsons ................ H04W 48/16 455/434 |
| 8,532,686 B2 | 9/2013 | Schmidt et al. |
| 8,542,805 B2 | 9/2013 | Agranovsky et al. |
| 8,543,665 B2 | 9/2013 | Ansari et al. |
| 8,547,962 B2 | 10/2013 | Ramachandran et al. |
| 8,565,117 B2 | 10/2013 | Hilt et al. |
| 8,572,391 B2 | 10/2013 | Golan et al. |
| 8,576,712 B2 | 11/2013 | Sabat et al. |
| 8,577,803 B2 | 11/2013 | Chatterjee et al. |
| 8,582,450 B1 | 11/2013 | Robesky |

(56) References Cited

U.S. PATENT DOCUMENTS

| | | |
|---|---|---|
| 8,594,626 B1 | 11/2013 | Woodson et al. |
| 8,601,136 B1 | 12/2013 | Fahlgren et al. |
| 8,611,338 B2 | 12/2013 | Lawson et al. |
| 8,613,102 B2 | 12/2013 | Nath |
| 8,621,598 B2 | 12/2013 | Lai et al. |
| 8,649,268 B2 | 2/2014 | Lawson et al. |
| 8,656,452 B2 | 2/2014 | Li et al. |
| 8,667,056 B1 | 3/2014 | Proulx et al. |
| 8,675,493 B2 | 3/2014 | Buddhikot et al. |
| 8,688,147 B2 | 4/2014 | Nguyen et al. |
| 8,695,077 B1 | 4/2014 | Gerhard et al. |
| 8,728,656 B2 | 5/2014 | Takahashi et al. |
| 8,751,801 B2 | 6/2014 | Harris et al. |
| 8,755,376 B2 | 6/2014 | Lawson et al. |
| 8,767,925 B2 | 7/2014 | Sureka et al. |
| 8,781,975 B2 | 7/2014 | Bennett et al. |
| 8,806,024 B1 | 8/2014 | Toba et al. |
| 8,819,133 B2 | 8/2014 | Wang |
| 8,825,746 B2 | 9/2014 | Ravichandran et al. |
| 8,837,465 B2 | 9/2014 | Lawson et al. |
| 8,838,707 B2 | 9/2014 | Lawson et al. |
| 8,843,596 B2 | 9/2014 | Goel et al. |
| 8,855,271 B2 | 10/2014 | Brock et al. |
| 8,861,510 B1 | 10/2014 | Fritz |
| 8,879,547 B2 | 11/2014 | Maes |
| 8,938,053 B2 | 1/2015 | Cooke et al. |
| 8,948,356 B2 | 2/2015 | Nowack et al. |
| 8,954,591 B2 | 2/2015 | Ganesan et al. |
| 8,964,726 B2 | 2/2015 | Lawson et al. |
| 8,990,610 B2 | 3/2015 | Bostick et al. |
| 9,014,664 B2 | 4/2015 | Kim et al. |
| 9,015,702 B2 | 4/2015 | Bhat |
| 9,031,223 B2 | 5/2015 | Smith et al. |
| 9,071,677 B2 | 6/2015 | Aggarwal et al. |
| 9,137,127 B2 | 9/2015 | Nowack et al. |
| 9,141,682 B1 | 9/2015 | Adoc, Jr. et al. |
| 9,161,296 B2 * | 10/2015 | Parsons ................ H04L 63/101 |
| 9,306,982 B2 | 4/2016 | Lawson et al. |
| 9,307,094 B2 | 4/2016 | Nowack et al. |
| 9,325,624 B2 | 4/2016 | Malatack et al. |
| 9,338,190 B2 | 5/2016 | Eng et al. |
| 9,344,573 B2 | 5/2016 | Wolthuis et al. |
| 9,378,337 B2 | 6/2016 | Kuhr |
| 9,456,008 B2 | 9/2016 | Lawson et al. |
| 9,456,339 B1 * | 9/2016 | Hildner ............. H04W 12/0013 |
| 9,596,274 B2 | 3/2017 | Lawson et al. |
| 9,628,624 B2 | 4/2017 | Wolthuis et al. |
| 9,632,875 B2 | 4/2017 | Raichstein et al. |
| 10,063,713 B2 | 8/2018 | Chaudhary et al. |
| 10,440,192 B2 | 10/2019 | Chaudhary et al. |
| 2001/0038624 A1 | 11/2001 | Greenberg et al. |
| 2001/0043684 A1 | 11/2001 | Guedalia et al. |
| 2001/0051996 A1 | 12/2001 | Cooper et al. |
| 2002/0006124 A1 | 1/2002 | Jimenez et al. |
| 2002/0006125 A1 | 1/2002 | Josse et al. |
| 2002/0006193 A1 | 1/2002 | Rodenbusch et al. |
| 2002/0025819 A1 | 2/2002 | Cetusic et al. |
| 2002/0057777 A1 | 5/2002 | Saito et al. |
| 2002/0064267 A1 | 5/2002 | Martin et al. |
| 2002/0067823 A1 | 6/2002 | Walker et al. |
| 2002/0077833 A1 | 6/2002 | Arons et al. |
| 2002/0126813 A1 | 9/2002 | Partovi et al. |
| 2002/0133587 A1 | 9/2002 | Ensel et al. |
| 2002/0136391 A1 | 9/2002 | Armstrong et al. |
| 2002/0165957 A1 | 11/2002 | Devoe et al. |
| 2002/0176378 A1 | 11/2002 | Hamilton et al. |
| 2002/0176404 A1 | 11/2002 | Girard |
| 2002/0184361 A1 | 12/2002 | Eden |
| 2002/0198941 A1 | 12/2002 | Gavrilescu et al. |
| 2003/0006137 A1 | 1/2003 | Wei et al. |
| 2003/0012356 A1 | 1/2003 | Zino et al. |
| 2003/0014665 A1 | 1/2003 | Anderson et al. |
| 2003/0018830 A1 | 1/2003 | Chen et al. |
| 2003/0023672 A1 | 1/2003 | Vaysman |
| 2003/0026426 A1 | 2/2003 | Wright et al. |
| 2003/0046366 A1 | 3/2003 | Pardikar et al. |
| 2003/0051037 A1 | 3/2003 | Sundaram et al. |
| 2003/0058884 A1 | 3/2003 | Kallner et al. |
| 2003/0059020 A1 | 3/2003 | Meyerson et al. |
| 2003/0060188 A1 | 3/2003 | Gidron et al. |
| 2003/0061317 A1 | 3/2003 | Brown et al. |
| 2003/0061404 A1 | 3/2003 | Atwal et al. |
| 2003/0088421 A1 | 5/2003 | Maes et al. |
| 2003/0097330 A1 | 5/2003 | Hillmer et al. |
| 2003/0097447 A1 | 5/2003 | Johnston |
| 2003/0097639 A1 | 5/2003 | Niyogi et al. |
| 2003/0103620 A1 | 6/2003 | Brown et al. |
| 2003/0123640 A1 | 7/2003 | Roelle et al. |
| 2003/0149721 A1 | 8/2003 | Alfonso-nogueiro et al. |
| 2003/0162506 A1 | 8/2003 | Toshimitsu et al. |
| 2003/0195950 A1 | 10/2003 | Huang et al. |
| 2003/0195990 A1 | 10/2003 | Greenblat et al. |
| 2003/0196076 A1 | 10/2003 | Zabarski et al. |
| 2003/0204616 A1 | 10/2003 | Billhartz et al. |
| 2003/0211842 A1 | 11/2003 | Kempf et al. |
| 2003/0231647 A1 | 12/2003 | Petrovykh |
| 2003/0233276 A1 | 12/2003 | Pearlman et al. |
| 2004/0008635 A1 | 1/2004 | Nelson et al. |
| 2004/0011690 A1 | 1/2004 | Marfino et al. |
| 2004/0044953 A1 | 3/2004 | Watkins et al. |
| 2004/0052349 A1 | 3/2004 | Creamer et al. |
| 2004/0071275 A1 | 4/2004 | Bowater et al. |
| 2004/0101122 A1 | 5/2004 | Da Palma et al. |
| 2004/0102182 A1 | 5/2004 | Reith et al. |
| 2004/0117788 A1 | 6/2004 | Karaoguz et al. |
| 2004/0136324 A1 | 7/2004 | Steinberg et al. |
| 2004/0165569 A1 | 8/2004 | Sweatman et al. |
| 2004/0172482 A1 | 9/2004 | Weissman et al. |
| 2004/0199572 A1 | 10/2004 | Hunt et al. |
| 2004/0205101 A1 | 10/2004 | Radhakrishnan |
| 2004/0205689 A1 | 10/2004 | Ellens et al. |
| 2004/0213400 A1 | 10/2004 | Golitsin et al. |
| 2004/0216058 A1 | 10/2004 | Chavers et al. |
| 2004/0218748 A1 | 11/2004 | Fisher |
| 2004/0228469 A1 | 11/2004 | Andrews et al. |
| 2004/0236696 A1 | 11/2004 | Aoki et al. |
| 2004/0240649 A1 | 12/2004 | Goel |
| 2005/0005109 A1 | 1/2005 | Castaldi et al. |
| 2005/0005200 A1 | 1/2005 | Matenda et al. |
| 2005/0010483 A1 | 1/2005 | Ling |
| 2005/0015505 A1 | 1/2005 | Kruis et al. |
| 2005/0021626 A1 | 1/2005 | Prajapat et al. |
| 2005/0025303 A1 | 2/2005 | Hostetler |
| 2005/0038772 A1 | 2/2005 | Colrain |
| 2005/0043952 A1 | 2/2005 | Sharma et al. |
| 2005/0047579 A1 | 3/2005 | Mansour |
| 2005/0060411 A1 | 3/2005 | Coulombe et al. |
| 2005/0083907 A1 | 4/2005 | Fishler |
| 2005/0091336 A1 | 4/2005 | Dehamer et al. |
| 2005/0091572 A1 | 4/2005 | Gavrilescu et al. |
| 2005/0108770 A1 | 5/2005 | Karaoguz et al. |
| 2005/0125251 A1 | 6/2005 | Berger et al. |
| 2005/0125739 A1 | 6/2005 | Thompson et al. |
| 2005/0128961 A1 | 6/2005 | Miloslavsky et al. |
| 2005/0135578 A1 | 6/2005 | Ress et al. |
| 2005/0141500 A1 | 6/2005 | Bhandari et al. |
| 2005/0147088 A1 | 7/2005 | Bao et al. |
| 2005/0177635 A1 | 8/2005 | Schmidt et al. |
| 2005/0181835 A1 | 8/2005 | Lau et al. |
| 2005/0198292 A1 | 9/2005 | Duursma et al. |
| 2005/0228680 A1 | 10/2005 | Malik |
| 2005/0238153 A1 | 10/2005 | Chevalier |
| 2005/0240659 A1 | 10/2005 | Taylor |
| 2005/0243977 A1 | 11/2005 | Creamer et al. |
| 2005/0246176 A1 | 11/2005 | Creamer et al. |
| 2005/0286496 A1 | 12/2005 | Malhotra et al. |
| 2005/0289222 A1 | 12/2005 | Sahim |
| 2006/0008065 A1 | 1/2006 | Longman et al. |
| 2006/0008073 A1 | 1/2006 | Yoshizawa et al. |
| 2006/0008256 A1 | 1/2006 | Khedouri et al. |
| 2006/0015467 A1 | 1/2006 | Morken et al. |
| 2006/0021004 A1 | 1/2006 | Moran et al. |
| 2006/0023676 A1 | 2/2006 | Whitmore et al. |
| 2006/0047666 A1 | 3/2006 | Bedi et al. |

(56) References Cited

U.S. PATENT DOCUMENTS

| | | |
|---|---|---|
| 2006/0067506 A1 | 3/2006 | Flockhart et al. |
| 2006/0080415 A1 | 4/2006 | Tu |
| 2006/0098624 A1 | 5/2006 | Morgan et al. |
| 2006/0129638 A1 | 6/2006 | Deakin |
| 2006/0143007 A1 | 6/2006 | Koh et al. |
| 2006/0146792 A1 | 7/2006 | Ramachandran et al. |
| 2006/0146802 A1 | 7/2006 | Baldwin et al. |
| 2006/0168334 A1 | 7/2006 | Potti et al. |
| 2006/0203979 A1 | 9/2006 | Jennings |
| 2006/0209695 A1 | 9/2006 | Archer, Jr. et al. |
| 2006/0212865 A1 | 9/2006 | Vincent et al. |
| 2006/0215824 A1 | 9/2006 | Mitby et al. |
| 2006/0217823 A1 | 9/2006 | Hussey |
| 2006/0217978 A1 | 9/2006 | Mitby et al. |
| 2006/0222166 A1 | 10/2006 | Ramakrishna et al. |
| 2006/0235715 A1 | 10/2006 | Abrams et al. |
| 2006/0256816 A1 | 11/2006 | Yarlagadda et al. |
| 2006/0262915 A1 | 11/2006 | Marascio et al. |
| 2006/0270386 A1 | 11/2006 | Yu et al. |
| 2006/0285489 A1 | 12/2006 | Francisco et al. |
| 2007/0002744 A1 | 1/2007 | Mewhinney et al. |
| 2007/0036143 A1 | 2/2007 | Alt et al. |
| 2007/0038499 A1 | 2/2007 | Margulies et al. |
| 2007/0043681 A1 | 2/2007 | Morgan et al. |
| 2007/0050306 A1 | 3/2007 | McQueen |
| 2007/0064672 A1 | 3/2007 | Raghav et al. |
| 2007/0070906 A1 | 3/2007 | Thakur |
| 2007/0070980 A1 | 3/2007 | Phelps et al. |
| 2007/0071223 A1 | 3/2007 | Lee et al. |
| 2007/0074174 A1 | 3/2007 | Thornton |
| 2007/0088836 A1 | 4/2007 | Tai et al. |
| 2007/0091907 A1 | 4/2007 | Seshadri et al. |
| 2007/0107048 A1 | 5/2007 | Halls et al. |
| 2007/0112574 A1 | 5/2007 | Greene |
| 2007/0116191 A1 | 5/2007 | Bermudez et al. |
| 2007/0121651 A1 | 5/2007 | Casey et al. |
| 2007/0127691 A1 | 6/2007 | Lert |
| 2007/0127703 A1 | 6/2007 | Siminoff |
| 2007/0130260 A1 | 6/2007 | Weintraub et al. |
| 2007/0133771 A1 | 6/2007 | Stifelman et al. |
| 2007/0147351 A1 | 6/2007 | Dietrich et al. |
| 2007/0149166 A1 | 6/2007 | Turcotte et al. |
| 2007/0153711 A1 | 7/2007 | Dykas et al. |
| 2007/0167170 A1 | 7/2007 | Fitchett et al. |
| 2007/0192629 A1 | 8/2007 | Saito |
| 2007/0201448 A1 | 8/2007 | Baird et al. |
| 2007/0208862 A1 | 9/2007 | Fox et al. |
| 2007/0232284 A1 | 10/2007 | Mason et al. |
| 2007/0239761 A1 | 10/2007 | Baio et al. |
| 2007/0242626 A1 | 10/2007 | Altberg et al. |
| 2007/0255828 A1 | 11/2007 | Paradise |
| 2007/0265073 A1 | 11/2007 | Novi et al. |
| 2007/0286180 A1 | 12/2007 | Marquette et al. |
| 2007/0291734 A1 | 12/2007 | Bhatia et al. |
| 2007/0291905 A1 | 12/2007 | Halliday et al. |
| 2007/0293200 A1 | 12/2007 | Roundtree et al. |
| 2007/0295803 A1 | 12/2007 | Levine et al. |
| 2008/0005275 A1 | 1/2008 | Overton et al. |
| 2008/0025320 A1 | 1/2008 | Bangalore et al. |
| 2008/0037715 A1 | 2/2008 | Prozeniuk et al. |
| 2008/0037746 A1 | 2/2008 | Dufrene et al. |
| 2008/0040484 A1 | 2/2008 | Yardley |
| 2008/0049617 A1 | 2/2008 | Grice et al. |
| 2008/0052395 A1 | 2/2008 | Wright et al. |
| 2008/0091843 A1 | 4/2008 | Kulkarni |
| 2008/0101571 A1 | 5/2008 | Harlow et al. |
| 2008/0104348 A1 | 5/2008 | Kabzinski et al. |
| 2008/0120702 A1 | 5/2008 | Hokimoto |
| 2008/0123559 A1 | 5/2008 | Haviv et al. |
| 2008/0134049 A1 | 6/2008 | Gupta et al. |
| 2008/0139166 A1 | 6/2008 | Agarwal et al. |
| 2008/0146268 A1 | 6/2008 | Gandhi et al. |
| 2008/0152101 A1 | 6/2008 | Griggs |
| 2008/0154601 A1 | 6/2008 | Stifelman et al. |
| 2008/0155029 A1 | 6/2008 | Helbling et al. |
| 2008/0162482 A1 | 7/2008 | Ahern et al. |
| 2008/0165708 A1 | 7/2008 | Moore et al. |
| 2008/0172404 A1 | 7/2008 | Cohen |
| 2008/0177883 A1 | 7/2008 | Hanai et al. |
| 2008/0192736 A1 | 8/2008 | Jabri et al. |
| 2008/0201426 A1 | 8/2008 | Darcie |
| 2008/0209050 A1 | 8/2008 | Li |
| 2008/0212945 A1 | 9/2008 | Khedouri et al. |
| 2008/0222656 A1 | 9/2008 | Lyman |
| 2008/0229421 A1 | 9/2008 | Hudis et al. |
| 2008/0232574 A1 | 9/2008 | Baluja et al. |
| 2008/0235230 A1 | 9/2008 | Maes |
| 2008/0256224 A1 | 10/2008 | Kaji et al. |
| 2008/0275741 A1 | 11/2008 | Loeffen |
| 2008/0307436 A1 | 12/2008 | Hamilton |
| 2008/0310599 A1 | 12/2008 | Purnadi et al. |
| 2008/0313318 A1 | 12/2008 | Vermeulen et al. |
| 2008/0316931 A1 | 12/2008 | Qiu et al. |
| 2008/0317222 A1 | 12/2008 | Griggs et al. |
| 2008/0317232 A1 | 12/2008 | Couse et al. |
| 2008/0317233 A1 | 12/2008 | Rey et al. |
| 2009/0018489 A1 | 1/2009 | Babaev |
| 2009/0046838 A1 | 2/2009 | Andreasson |
| 2009/0052437 A1 | 2/2009 | Taylor et al. |
| 2009/0052641 A1 | 2/2009 | Taylor et al. |
| 2009/0059894 A1 | 3/2009 | Jackson et al. |
| 2009/0063502 A1 | 3/2009 | Coimbatore et al. |
| 2009/0074159 A1 | 3/2009 | Goldfarb et al. |
| 2009/0075684 A1 | 3/2009 | Cheng et al. |
| 2009/0083155 A1 | 3/2009 | Tudor et al. |
| 2009/0089165 A1 | 4/2009 | Sweeney |
| 2009/0089352 A1 | 4/2009 | Davis et al. |
| 2009/0089699 A1 | 4/2009 | Saha et al. |
| 2009/0092674 A1 | 4/2009 | Ingram et al. |
| 2009/0093250 A1 | 4/2009 | Jackson et al. |
| 2009/0125608 A1 | 5/2009 | Werth et al. |
| 2009/0129573 A1 | 5/2009 | Gavan et al. |
| 2009/0136011 A1 | 5/2009 | Goel |
| 2009/0149175 A1* | 6/2009 | Lopresti ............... H04W 8/265 455/433 |
| 2009/0170496 A1 | 7/2009 | Bourque |
| 2009/0171659 A1 | 7/2009 | Pearce et al. |
| 2009/0171669 A1 | 7/2009 | Engelsma et al. |
| 2009/0171752 A1 | 7/2009 | Galvin et al. |
| 2009/0182896 A1 | 7/2009 | Patterson et al. |
| 2009/0193433 A1 | 7/2009 | Maes |
| 2009/0216835 A1 | 8/2009 | Jain et al. |
| 2009/0217293 A1 | 8/2009 | Wolber et al. |
| 2009/0220057 A1 | 9/2009 | Waters |
| 2009/0221310 A1 | 9/2009 | Chen et al. |
| 2009/0222341 A1 | 9/2009 | Belwadi et al. |
| 2009/0225748 A1 | 9/2009 | Taylor |
| 2009/0225763 A1 | 9/2009 | Forsberg et al. |
| 2009/0228868 A1 | 9/2009 | Drukman et al. |
| 2009/0232289 A1 | 9/2009 | Drucker et al. |
| 2009/0234965 A1 | 9/2009 | Viveganandhan et al. |
| 2009/0235349 A1 | 9/2009 | Lai et al. |
| 2009/0241135 A1 | 9/2009 | Wong et al. |
| 2009/0252159 A1 | 10/2009 | Lawson et al. |
| 2009/0262725 A1 | 10/2009 | Chen et al. |
| 2009/0276771 A1 | 11/2009 | Nickolov et al. |
| 2009/0288012 A1 | 11/2009 | Hertel et al. |
| 2009/0288165 A1 | 11/2009 | Qiu et al. |
| 2009/0300194 A1 | 12/2009 | Ogasawara |
| 2009/0316687 A1 | 12/2009 | Kruppa |
| 2009/0318112 A1 | 12/2009 | Vasten |
| 2010/0027531 A1 | 2/2010 | Kurashima |
| 2010/0037204 A1 | 2/2010 | Lin et al. |
| 2010/0054142 A1 | 3/2010 | Moiso et al. |
| 2010/0070424 A1 | 3/2010 | Monk |
| 2010/0071053 A1 | 3/2010 | Ansari et al. |
| 2010/0082513 A1 | 4/2010 | Liu |
| 2010/0087215 A1 | 4/2010 | Gu et al. |
| 2010/0088187 A1 | 4/2010 | Courtney et al. |
| 2010/0088698 A1 | 4/2010 | Krishnamurthy |
| 2010/0094758 A1 | 4/2010 | Chamberlain et al. |
| 2010/0103845 A1 | 4/2010 | Ulupinar et al. |
| 2010/0107222 A1 | 4/2010 | Glasser |
| 2010/0115041 A1 | 5/2010 | Hawkins et al. |

(56) References Cited

U.S. PATENT DOCUMENTS

| | | |
|---|---|---|
| 2010/0138501 A1 | 6/2010 | Clinton et al. |
| 2010/0142516 A1 | 6/2010 | Lawson et al. |
| 2010/0150139 A1 | 6/2010 | Lawson et al. |
| 2010/0167689 A1 | 7/2010 | Sepehri-Nik et al. |
| 2010/0188979 A1 | 7/2010 | Thubert et al. |
| 2010/0191915 A1 | 7/2010 | Spencer |
| 2010/0208881 A1 | 8/2010 | Kawamura |
| 2010/0217837 A1 | 8/2010 | Ansari et al. |
| 2010/0217982 A1 | 8/2010 | Brown et al. |
| 2010/0232594 A1 | 9/2010 | Lawson et al. |
| 2010/0235539 A1 | 9/2010 | Carter et al. |
| 2010/0250946 A1 | 9/2010 | Korte et al. |
| 2010/0251329 A1 | 9/2010 | Wei |
| 2010/0251340 A1 | 9/2010 | Martin et al. |
| 2010/0265825 A1 | 10/2010 | Blair et al. |
| 2010/0281108 A1 | 11/2010 | Cohen |
| 2010/0291910 A1 | 11/2010 | Sanding et al. |
| 2010/0299437 A1 | 11/2010 | Moore |
| 2010/0312919 A1 | 12/2010 | Lee et al. |
| 2010/0332852 A1 | 12/2010 | Vembu et al. |
| 2011/0026516 A1 | 2/2011 | Roberts et al. |
| 2011/0029882 A1 | 2/2011 | Jaisinghani |
| 2011/0029981 A1 | 2/2011 | Jaisinghani |
| 2011/0053555 A1 | 3/2011 | Cai et al. |
| 2011/0078278 A1 | 3/2011 | Cui et al. |
| 2011/0081008 A1 | 4/2011 | Lawson et al. |
| 2011/0083069 A1 | 4/2011 | Paul et al. |
| 2011/0083179 A1 | 4/2011 | Lawson et al. |
| 2011/0093516 A1 | 4/2011 | Geng et al. |
| 2011/0096673 A1 | 4/2011 | Stevenson et al. |
| 2011/0110366 A1 | 5/2011 | Moore et al. |
| 2011/0131293 A1 | 6/2011 | Mori |
| 2011/0138453 A1 | 6/2011 | Verma et al. |
| 2011/0143714 A1 | 6/2011 | Keast et al. |
| 2011/0145049 A1 | 6/2011 | Hertel et al. |
| 2011/0149810 A1 | 6/2011 | Koren et al. |
| 2011/0149950 A1 | 6/2011 | Petit-Huguenin et al. |
| 2011/0151884 A1 | 6/2011 | Zhao |
| 2011/0158235 A1 | 6/2011 | Senga |
| 2011/0167172 A1 | 7/2011 | Roach et al. |
| 2011/0170505 A1 | 7/2011 | Rajasekar et al. |
| 2011/0176537 A1 | 7/2011 | Lawson et al. |
| 2011/0179126 A1 | 7/2011 | Wetherell et al. |
| 2011/0211679 A1 | 9/2011 | Mezhibovsky et al. |
| 2011/0251921 A1 | 10/2011 | Kassaei et al. |
| 2011/0253693 A1 | 10/2011 | Lyons et al. |
| 2011/0255675 A1 | 10/2011 | Jasper et al. |
| 2011/0258432 A1 | 10/2011 | Rao et al. |
| 2011/0265168 A1 | 10/2011 | Lucovsky et al. |
| 2011/0265172 A1 | 10/2011 | Sharma et al. |
| 2011/0267985 A1 | 11/2011 | Wilkinson et al. |
| 2011/0274111 A1 | 11/2011 | Narasappa et al. |
| 2011/0276892 A1 | 11/2011 | Jensen-Horne et al. |
| 2011/0276951 A1 | 11/2011 | Jain |
| 2011/0280390 A1 | 11/2011 | Lawson et al. |
| 2011/0283259 A1 | 11/2011 | Lawson et al. |
| 2011/0289126 A1 | 11/2011 | Aikas et al. |
| 2011/0289162 A1 | 11/2011 | Furlong et al. |
| 2011/0299672 A1 | 12/2011 | Chiu et al. |
| 2011/0310902 A1 | 12/2011 | Xu |
| 2011/0313950 A1 | 12/2011 | Nuggehalli et al. |
| 2011/0320449 A1 | 12/2011 | Gudlavenkatasiva |
| 2011/0320550 A1 | 12/2011 | Lawson et al. |
| 2012/0000903 A1 | 1/2012 | Baarman et al. |
| 2012/0011274 A1 | 1/2012 | Moreman |
| 2012/0017222 A1 | 1/2012 | May |
| 2012/0023531 A1 | 1/2012 | Meuninck et al. |
| 2012/0023544 A1 | 1/2012 | Li et al. |
| 2012/0027228 A1 | 2/2012 | Rijken et al. |
| 2012/0028602 A1 | 2/2012 | Lisi et al. |
| 2012/0036574 A1 | 2/2012 | Heithcock et al. |
| 2012/0039202 A1 | 2/2012 | Song |
| 2012/0059709 A1 | 3/2012 | Lieberman et al. |
| 2012/0079066 A1 | 3/2012 | Li et al. |
| 2012/0083266 A1 | 4/2012 | Vanswol et al. |
| 2012/0089572 A1 | 4/2012 | Raichstein et al. |
| 2012/0094633 A1* | 4/2012 | Parsons ............... H04L 63/101 455/411 |
| 2012/0094637 A1 | 4/2012 | Jeyaseelan et al. |
| 2012/0101952 A1 | 4/2012 | Raleigh et al. |
| 2012/0110564 A1 | 5/2012 | Ran et al. |
| 2012/0114112 A1 | 5/2012 | Rauschenberger et al. |
| 2012/0149404 A1 | 6/2012 | Beattie et al. |
| 2012/0166488 A1 | 6/2012 | Kaushik et al. |
| 2012/0170726 A1 | 7/2012 | Schwartz |
| 2012/0173610 A1 | 7/2012 | Bleau et al. |
| 2012/0174095 A1 | 7/2012 | Natchadalingam et al. |
| 2012/0179646 A1 | 7/2012 | Hinton et al. |
| 2012/0180021 A1 | 7/2012 | Byrd et al. |
| 2012/0180029 A1 | 7/2012 | Hill et al. |
| 2012/0185561 A1 | 7/2012 | Klein et al. |
| 2012/0198004 A1 | 8/2012 | Watte |
| 2012/0201238 A1 | 8/2012 | Lawson et al. |
| 2012/0202449 A1* | 8/2012 | Meyer ............... H04L 12/1442 455/405 |
| 2012/0208495 A1 | 8/2012 | Lawson et al. |
| 2012/0221603 A1 | 8/2012 | Kothule et al. |
| 2012/0226579 A1 | 9/2012 | Ha et al. |
| 2012/0239757 A1 | 9/2012 | Firstenberg et al. |
| 2012/0240226 A1 | 9/2012 | Li |
| 2012/0246273 A1 | 9/2012 | Bornstein et al. |
| 2012/0254828 A1 | 10/2012 | Aiylam et al. |
| 2012/0266258 A1 | 10/2012 | Tuchman et al. |
| 2012/0281536 A1 | 11/2012 | Gell et al. |
| 2012/0288082 A1 | 11/2012 | Segall |
| 2012/0290706 A1 | 11/2012 | Lin et al. |
| 2012/0304245 A1 | 11/2012 | Lawson et al. |
| 2012/0304275 A1 | 11/2012 | Ji et al. |
| 2012/0316809 A1 | 12/2012 | Egolf et al. |
| 2012/0321058 A1 | 12/2012 | Eng et al. |
| 2012/0321070 A1 | 12/2012 | Smith et al. |
| 2013/0029629 A1 | 1/2013 | Lindholm et al. |
| 2013/0031158 A1 | 1/2013 | Salsburg |
| 2013/0031613 A1 | 1/2013 | Shanabrook et al. |
| 2013/0036476 A1 | 2/2013 | Roever et al. |
| 2013/0047232 A1 | 2/2013 | Tuchman et al. |
| 2013/0054517 A1 | 2/2013 | Beechuk et al. |
| 2013/0054684 A1 | 2/2013 | Brazier et al. |
| 2013/0058262 A1 | 3/2013 | Parreira |
| 2013/0067232 A1 | 3/2013 | Cheung et al. |
| 2013/0067448 A1 | 3/2013 | Sannidhanam et al. |
| 2013/0097298 A1 | 4/2013 | Ting et al. |
| 2013/0110658 A1 | 5/2013 | Lyman |
| 2013/0132573 A1 | 5/2013 | Lindblom |
| 2013/0139148 A1 | 5/2013 | Berg et al. |
| 2013/0156024 A1 | 6/2013 | Burg |
| 2013/0166580 A1 | 6/2013 | Maharajh et al. |
| 2013/0179942 A1 | 7/2013 | Caplis et al. |
| 2013/0201909 A1 | 8/2013 | Bosch et al. |
| 2013/0204786 A1 | 8/2013 | Mattes et al. |
| 2013/0212603 A1 | 8/2013 | Cooke et al. |
| 2013/0244632 A1 | 9/2013 | Spence et al. |
| 2013/0268676 A1 | 10/2013 | Martins et al. |
| 2013/0288676 A1* | 10/2013 | Parsons ............. H04W 12/0609 455/434 |
| 2013/0325934 A1 | 12/2013 | Fausak et al. |
| 2013/0328997 A1 | 12/2013 | Desai |
| 2013/0336235 A1* | 12/2013 | Meyer .................... H04L 67/20 370/329 |
| 2013/0336472 A1 | 12/2013 | Fahlgren et al. |
| 2014/0013400 A1 | 1/2014 | Warshavsky et al. |
| 2014/0022954 A1* | 1/2014 | Akers ............... H04M 15/8022 370/259 |
| 2014/0023026 A1* | 1/2014 | Meyer .................... H04L 67/20 370/329 |
| 2014/0025503 A1* | 1/2014 | Meyer .................. H04L 12/1403 705/14.64 |
| 2014/0058806 A1 | 2/2014 | Guenette et al. |
| 2014/0064467 A1 | 3/2014 | Lawson et al. |
| 2014/0072115 A1 | 3/2014 | Makagon et al. |
| 2014/0073291 A1* | 3/2014 | Hildner ................... H04W 4/50 455/411 |

(56) References Cited

U.S. PATENT DOCUMENTS

| | | |
|---|---|---|
| 2014/0078991 A1* | 3/2014 | Trotter .............. H04L 12/1442 370/329 |
| 2014/0095627 A1 | 4/2014 | Romagnino |
| 2014/0101058 A1 | 4/2014 | Castel et al. |
| 2014/0101149 A1 | 4/2014 | Winters et al. |
| 2014/0105372 A1 | 4/2014 | Nowack et al. |
| 2014/0106704 A1 | 4/2014 | Cooke et al. |
| 2014/0122600 A1 | 5/2014 | Kim et al. |
| 2014/0123187 A1 | 5/2014 | Reisman |
| 2014/0126715 A1 | 5/2014 | Lum et al. |
| 2014/0129363 A1 | 5/2014 | Lorah et al. |
| 2014/0153565 A1 | 6/2014 | Lawson et al. |
| 2014/0185490 A1 | 7/2014 | Holm et al. |
| 2014/0254600 A1 | 9/2014 | Shibata et al. |
| 2014/0258481 A1 | 9/2014 | Lundell |
| 2014/0269333 A1 | 9/2014 | Boerjesson |
| 2014/0274086 A1 | 9/2014 | Boerjesson et al. |
| 2014/0282473 A1 | 9/2014 | Saraf et al. |
| 2014/0289391 A1 | 9/2014 | Balaji et al. |
| 2014/0304054 A1 | 10/2014 | Orun et al. |
| 2014/0317640 A1 | 10/2014 | Harm et al. |
| 2014/0351880 A1 | 11/2014 | Low et al. |
| 2014/0355600 A1 | 12/2014 | Lawson et al. |
| 2014/0372508 A1 | 12/2014 | Fausak et al. |
| 2014/0372509 A1 | 12/2014 | Fausak et al. |
| 2014/0372510 A1 | 12/2014 | Fausak et al. |
| 2014/0373098 A1 | 12/2014 | Fausak et al. |
| 2014/0379670 A1 | 12/2014 | Kuhr |
| 2015/0004932 A1 | 1/2015 | Kim et al. |
| 2015/0004933 A1 | 1/2015 | Kim et al. |
| 2015/0023251 A1 | 1/2015 | Giakoumelis et al. |
| 2015/0026477 A1 | 1/2015 | Malatack et al. |
| 2015/0031328 A1* | 1/2015 | Ramprasad ......... H04L 12/1414 455/405 |
| 2015/0066865 A1 | 3/2015 | Yara et al. |
| 2015/0081918 A1 | 3/2015 | Nowack et al. |
| 2015/0082378 A1 | 3/2015 | Collison |
| 2015/0100634 A1 | 4/2015 | He et al. |
| 2015/0119050 A1 | 4/2015 | Liao et al. |
| 2015/0131651 A1* | 5/2015 | Tarricone .............. H04L 65/102 370/352 |
| 2015/0181631 A1 | 6/2015 | Lee et al. |
| 2015/0236905 A1 | 8/2015 | Bellan et al. |
| 2015/0281294 A1 | 10/2015 | Nur et al. |
| 2015/0365480 A1 | 12/2015 | Soto et al. |
| 2015/0370788 A1 | 12/2015 | Bareket et al. |
| 2015/0381580 A1 | 12/2015 | Graham, III et al. |
| 2016/0011758 A1 | 1/2016 | Dornbush et al. |
| 2016/0028695 A1 | 1/2016 | Binder |
| 2016/0077693 A1* | 3/2016 | Meyer ................ H04W 72/04 715/734 |
| 2016/0112475 A1 | 4/2016 | Lawson et al. |
| 2016/0112521 A1 | 4/2016 | Lawson et al. |
| 2016/0119291 A1 | 4/2016 | Zollinger et al. |
| 2016/0127254 A1 | 5/2016 | Kumar et al. |
| 2016/0149956 A1 | 5/2016 | Birnbaum et al. |
| 2016/0162172 A1 | 6/2016 | Rathod |
| 2016/0205519 A1 | 7/2016 | Patel et al. |
| 2016/0226937 A1 | 8/2016 | Patel et al. |
| 2016/0226979 A1 | 8/2016 | Lancaster et al. |
| 2016/0234391 A1 | 8/2016 | Wolthuis et al. |
| 2016/0239770 A1 | 8/2016 | Batabyal et al. |
| 2016/0316363 A1* | 10/2016 | Li ..................... H04L 12/2809 |
| 2017/0257274 A1* | 9/2017 | Ahart .................. H04W 4/50 |
| 2017/0332273 A1* | 11/2017 | Link, II .............. H04W 8/183 |
| 2017/0339283 A1* | 11/2017 | Chaudhary ......... H04M 15/715 |
| 2018/0332179 A1* | 11/2018 | Chaudhary ......... H04M 15/715 |
| 2019/0259097 A1* | 8/2019 | Raleigh .............. G06Q 20/0855 |
| 2020/0053226 A1 | 2/2020 | Chaudhary et al. |
| 2020/0137558 A1* | 4/2020 | Chaugule ............ H04W 8/24 |

FOREIGN PATENT DOCUMENTS

| | | |
|---|---|---|
| EP | 1464418 A1 | 10/2004 |
| EP | 1522922 A2 | 4/2005 |
| EP | 1770586 A1 | 4/2007 |
| EP | 2053869 A1 | 4/2009 |
| ES | 2134107 A1 | 9/1999 |
| JP | 10294788 A | 11/1998 |
| JP | 2004166000 A | 6/2004 |
| JP | 2004220118 A | 8/2004 |
| JP | 2006319914 A | 11/2006 |
| WO | WO-9732448 A1 | 9/1997 |
| WO | WO-2002087804 A1 | 11/2002 |
| WO | WO-2006037492 A1 | 4/2006 |
| WO | WO-2009018489 A2 | 2/2009 |
| WO | WO-2009124223 A1 | 10/2009 |
| WO | WO-2010037064 A1 | 4/2010 |
| WO | WO-20100040010 A1 | 4/2010 |
| WO | WO-2010101935 A1 | 9/2010 |
| WO | WO-2011091085 A1 | 7/2011 |

OTHER PUBLICATIONS

"U.S. Appl. No. 15/602,809, Corrected Notice of Allowance dated May 9, 2018", 3 pgs.

"U.S. Appl. No. 15/602,809, Non Final Office Action dated Dec. 13, 2017", 12 pgs.

"U.S. Appl. No. 15/602,809, Notice of Allowance dated Apr. 20, 2018", 8 pgs.

"U.S. Appl. No. 15/602,809, PTO Response to Rule 312 Communication dated Jul. 26, 2018", 2 pgs.

"U.S. Appl. No. 15/602,809, Response filed Mar. 13, 2018 to Non Final Office Action dated Dec. 13, 2017", 11 pgs.

"U.S. Appl. No. 16/042,823, Non Final Office Action dated Dec. 14, 2018", 22 pgs.

"U.S. Appl. No. 16/042,823, Notice of Allowance dated May 23, 2019", 13 pgs.

"U.S. Appl. No. 16/042,823, Response filed Apr. 26, 2019 to Non Final Office Action dated Dec. 14, 2018", 14 pgs.

"U.S. Appl. No. 16/545,985, Non Final Office Action dated Dec. 11, 2019", 14 pgs.

"U.S. Appl. No. 16/545,985, Response filed Mar. 11, 2020 to Non Final Office Action dated Dec. 11, 2019", 9 pgs.

"Archive Microsoft Office 365 Email | Retain Unified Archiving", GWAVA, Inc., Montreal, Canada, [Online] Retrieved from the Internet: <URL: http://www.gwava.com/Retain/Retain for_Office_365.php>, (2015), 4 pgs.

"Complaint for Patent Infringement", *Telinit Technologies*, LLC v. *Twilio Inc* 2:12-cv-663, (Oct. 12, 2012), 17 pgs.

"Ethernet to Token Ring Bridge", Black Box Corporation, [Online] Retrieved from the Internet: <URL: http://blackboxcanada.com/resource/files/productdetails/17044.pdf>, (Oct. 1999), 2 pgs.

"Twilio Cloud Communications—APIs for Voice, VoIP, and Text Messaging", Twilio, [Online] Retrieved from the Internet: <URL: http://www.twilio.com/docs/api/rest/call-feedback>, (Jun. 24, 2015), 8 pgs.

Abu-Lebdeh, et al., "A 3GPP Evolved Packet Core-Based Architecture for QoS-Enabled Mobile Video Surveillance Applications", 2012 Third International Conference on the Network of the Future {NOF), (Nov. 21-23, 2012), 1-6.

Barakovic, Sabina, et al., "Survey and Challenges of QoE Management Issues in Wireless Networks", Hindawi Publishing Corporation, (2012), 1-29.

Berners-Lee, T., "RFC 3986: Uniform Resource Identifier (URI): Generic Syntax", The Internet Society, [Online]. Retrieved from the Internet: <URL: http://tools.ietf.org/html/rfc3986>, (Jan. 2005), 57 pgs.

Kim Hwa-Jong, et al., "In-Service Feedback QoE Framework", 2010 Third International Conference on Communication Theory. Reliability and Quality of Service, (2010), 135-138.

Matos, et al., "Quality of Experience-based Routing in Multi-Service Wireless Mesh Networks", Realizing Advanced Video Optimized Wireless Networks. IEEE, (2012), 7060-7065.

(56) References Cited

OTHER PUBLICATIONS

Mu, Mu, et al., "Quality Evaluation in Peer-to-Peer IPTV Services", Data Traffic and Monitoring Analysis, LNCS 7754, 302-319, (2013), 18 pgs.
Subramanya, et al., "Digital Signatures", IEEE Potentials, (Mar./Apr. 2006), 5-8.
Tran, et al., "User to User adaptive routing based on QoE", ICNS 2011: The Seventh International Conference on Networking and Services, (2011), 170-177.
"U.S. Appl. No. 16/545,985, Final Office Action dated Jul. 13, 2020", 13 pgs.
U.S. Appl. No. 15/602,809, now U.S. Pat. No. 10,063,713, filed May 23, 2017, "System and Method for Programmatic Device Connectivity".
U.S. Appl. No. 16/042,823, now U.S. Pat. No. 10,440,192, filed Jul. 23, 2018, "System and Method for Programmatic Device Connectivity".
U.S. Appl. No. 16/545,985, filed Aug. 20, 2019, "System and Method for Programmatic Device Connectivity".

\* cited by examiner

```
{
  "url": "https://example.com/wireless/
Devices/DEb8eff/Usage",
  "period": {
    "start": "2016-05-01T00:00:00Z",
    "end": "2016-05-19T22:33:54Z"
  },
  "account_sid": "AC8caa2afb9",
  "data_costs": {
    "sent": 5,
    "received": 6,
    "total": 11,
    "price_unit": "USD"
  },
  "data_usage": {
    "sent": 1024,
    "received": 548,
    "total": 1572
  },
  "commands_costs": {
    "sent": 12,
    "received": 3,
    "total": 15,
    "price_unit": "USD"
  },
  "commands_usage": {
    "sent": 1000,
    "received": 231,
    "total": 1231
  },
  "device_sid": "DEb8eff34b248d0",
  "device_alias": "524116518656369"
}
```

FIGURE 2

```
{
   "date_updated" : "2016-05-13T22:19:53Z",
   "commands_callback_url" : null,
   "date_created" : "2016-05-09T23:01:05Z",
   "alias" : "524116518656369",
   "url" : "https://example.com/wireless/Devices/DEd3f4ec6c8",
   "commands_callback_method" : "POST",
   "status" : "active",
   "friendly_name" : "Alice's SmartMeter",
   "sid" : "DEd3f4ec6c8",
   "account_sid" : "AC8caa2afb9d52799",
   "links" : {
       "rate_plan" : "https://example.com/wireless/RatePlans/WP4ff4de42eb7e",
       "usage" : "https://example.com/wireless/Devices/DEd3f4ec6c8/Usage"
   },
   "sim_identifier" : "8901260882204697834",
   "rate_plan_sid" : "WP4ff4de42eb7e"
}
```

FIGURE 5

```
{   ...
    "capabilities" : {
        "data" : [
            ["home", "international-roaming"]
        ],
        "voice" : [
            ["home", "international-roaming"]
        ],
        "messaging" : [
            ["home", "international-roaming"]
        ],
        "commands" : [[]]}
...}
```

FIGURE 6

```
{
    ...
    "cap_period": 1,
    "cap_unit": "days",
    "data_cap": 50,
    "voice_cap": 30,
    "messaging_cap": 0,
    "commands_cap": 0
    ...
}
```

FIGURE 7

SYSTEM AND METHOD FOR PROGRAMMATIC DEVICE CONNECTIVITY

CROSS-REFERENCE TO RELATED APPLICATIONS

This application is a continuation of and claims the benefit of U.S. patent application Ser. No. 16/545,985, filed on 20 Aug. 2019, which is a continuation of and claims the benefit of U.S. patent application Ser. No. 16/042,823, filed on 23 Jul. 2018, which is a continuation of and claims the benefit of U.S. patent application Ser. No. 15/602,809, filed on 23 May 2017, which claims the benefit of U.S. Provisional Application No. 62/340,333, filed on 23 May 2016, all of which are incorporated herein by reference.

TECHNICAL FIELD

This invention relates generally to the communication field, and more specifically to a new and useful system and method for programmatic device connectivity in the communication field.

BACKGROUND

More and more devices are becoming network enabled. Personal computing devices such as phones, tablets, watches, and laptops may be accompanied with SIM cards or other mechanisms to connect to a carrier network. However, such connectivity is not limited to personal computers. The internet of things trend has led to various devices like gas meters, cars, and other devices to use internet connectivity. Developing and managing such connectivity devices can be complicated and expensive. In some cases, an individual will have to establish a new long-term contract with a telecomm provider to activate usage. This is not only cumbersome but can be impractical for some applications where the data usage is very low. There are numerous barriers that act as hurdles for developers and companies. Thus, there is a need in the communication field to create a new and useful system and method for programmatic device connectivity. This invention provides such a new and useful system and method.

BRIEF DESCRIPTION OF THE FIGURES

FIG. 2 is an exemplary representation of an API response to a request to a device usage resource;

FIG. 5 is an exemplary representation of an API response to a request to a device resource;

FIG. 6 is an exemplary representation of enabled capabilities of a connectivity plan resource;

FIG. 7 is an exemplary representation of usage limits of a connectivity plan resource;

DESCRIPTION OF THE PREFERRED EMBODIMENTS

Figure 1:
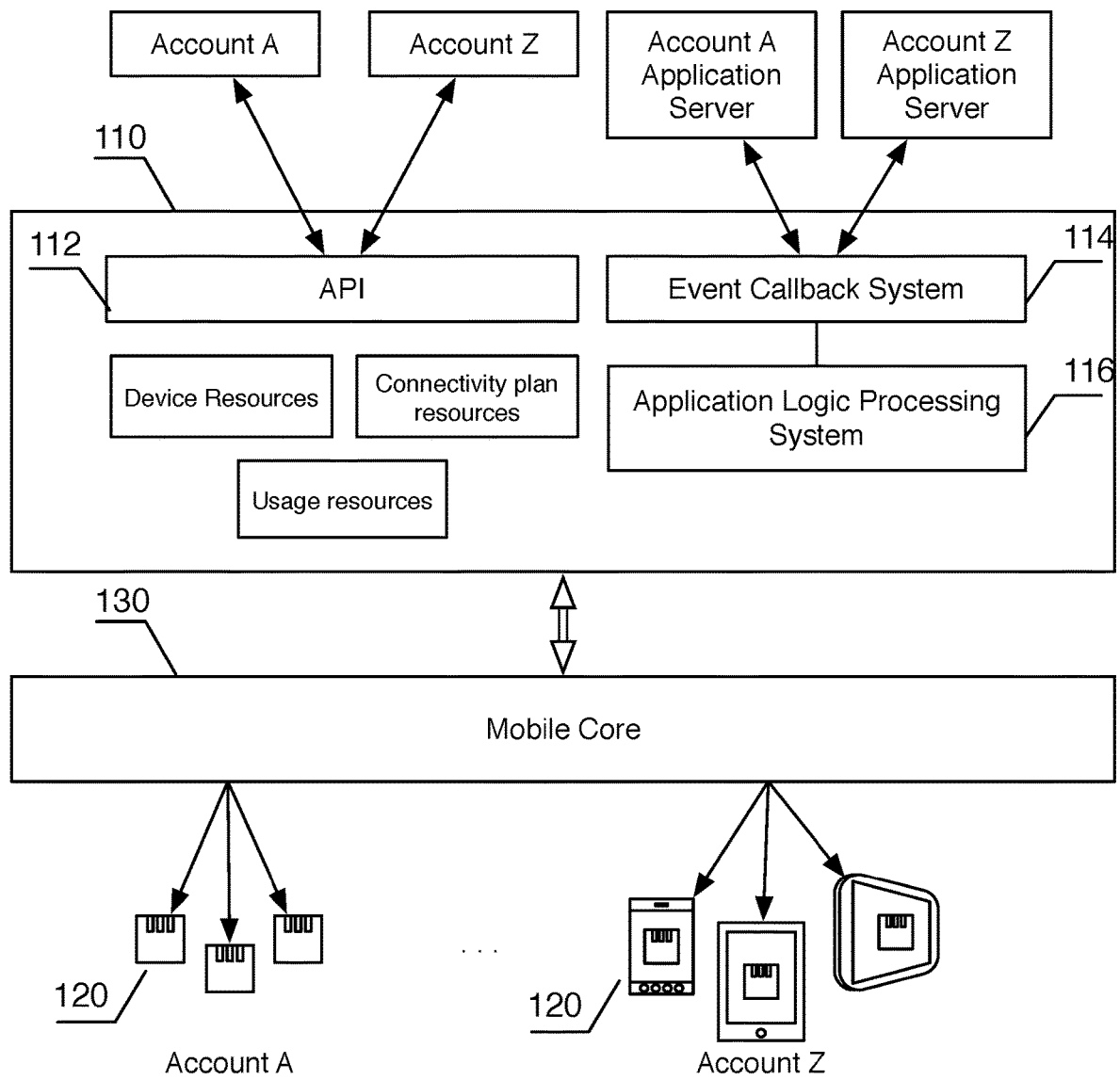
FIG. 1 is a schematic representation of a system of a preferred embodiment.

The following description of preferred embodiments of the invention is not intended to limit the invention to these preferred embodiments, but rather to enable any person skilled in the art to make and use this invention.

1. Overview

A method and system for programmatic device connectivity functions to enable connected devices to be programmatically controlled, monitored, and/or otherwise managed. The method and system preferably enable a programmatic approach to managing cellular-connected IoT (Internet of Things) devices, phones, tablets, and other computing devices, and enabling the ability to program each call, text, and/or data packet. The method and system are preferably implemented in connection with distributed SIM cards (i.e. subscriber identity module cards) that operate with one or more mobile cores used in providing data, SMS/MMS messaging, voice, and other communication channels. The SIM cards are preferably programmatically managed from a communication platform, which may enable various administrative interfaces including an administrator dashboard and/or programmatic interfaces. Programmatic interfaces can include an API, application logic processing routines, callback events, and/or other suitable programmatic interfaces.

The system and method are preferably implemented by a communication platform. The communication platform is preferably a multi-tenant platform where users are managers of different implementations using the programmatic cellular connectivity capabilities of the system and method. In one variation, the communication platform is an independent computing platform that provides functionality in cooperation with a cellular network. In another variation, the communication platform is a component of a cellular network system.

As one potential benefit, the system and method may enable simplified management of device connectivity. The system and method offer remote provisioning and ordering of SIM cards. This can be particularly applicable when managing multiple devices. In one application, a business may utilize the communication platform of the system and method to manage a fleet of worker phones. The business could control activation/deactivation of worker-used phones, define custom functionality, programmatically augment functionality, and/or collect data on usage. In another application, a deployment of IoT devices could use a communication platform's implementation of the system and method for a unified data plan for the IoT devices that simplifies the deployment, addition of devices, and/or billing.

As another potential benefit, the system and method can facilitate offering a programmable mobile network, wherein various processes of a communication network can be programmatically controlled and customized. Where traditional wireless customers are limited to standard features of a carrier, a programmable wireless network could offer opportunities for any entity to build custom rules and features that are enabled within their network. Additionally such customization can be compatible out of network. While a phone number may or may not be associated with a SIM card connectivity device, the origin phone number during outbound calls could be dynamically set through the communication platform. Additionally, the routing of communications to a destination address could additionally be dynamically set. In one example, a business could use this to setup customized internal routing options for a fleet of workers. For example, the system and method could provide an easy approach to setting up custom phone numbers that when dials are routed to different departments. For example, a company could configure an implementation where dialing one directs the caller to one department, and dialing two to another department. Furthermore, these customized routing rules can be customized per SIM card.

As another potential benefit, the system and method may enable a command communication channel that can be utilized for machine-to-machine communications. The command communication channel can be useful for IoT and other device applications.

The method and system can be applied to a variety of use cases. Generally, the system and method is implemented in a multitenant platform that serves multiple entities. Through the platform, the various entities may apply the method and system to their own particular use cases.

In one exemplary use of the system and method, a business may want to provide its employees with company managed phones. SIM cards can be provisioned for all employees through the system and method. Depending on the needs of the business, different features may be enabled.

In one implementation, the system and method can be used in monitoring usage. In another implementation, the system and method could be used to simulate a virtual carrier. The connected devices can be set to appear to be connected to the business's own carrier, wherein the actual carrier is transparent to the end user.

In another implementation, the system and method can be used for remotely activating, suspending, and/or deactivating devices. This can be useful with a dynamic work force where people join and leave.

In another implementation, the system and method could be used for automatically encrypting all communications or communications matching particular properties (e.g., communications between employees or with customers). The programmatic capabilities can detect messages and/or communications satisfying some condition, and the message or communication could be encrypted or otherwise converted.

In another implementation, the system and method could be used to set custom data or communication rules. For example, particular endpoints may be whitelisted or blacklisted for a device. Similarly, some websites and/or network-accessed services can be blocked for internet data communications.

In another implementation, the system and method could be used to build custom features such as changing what phone number is associated with a device based on various conditions such as the location of the device or the time of day. The phone number used to call a worker may change based on location, which may be useful for contextually making a worker available.

In another implementation, the system and method could be used to bridge different communication channels. For example, an SMS sent to a fellow employee may be converted to an IP message using a private IP messaging channel of the business.

While the system and method can be used for more traditional phone communication use cases, the system and method could additionally be beneficial to alternative device communication challenges such as building an internet of things device. SIM cards could be provisioned for a set of different computing devices. In one aspect, the system and method can make provisioning of a SIM card for a device a straightforward procedure for a developer or manufacturer. The system and method can be used to enable simple distribution of IoT devices because of a streamlined provisioning process. The developer or manufacturer of the IoT product can provision a SIM for a device. Then, when a customer or the IoT device is ready to be used, the SIM card could be activated with a data usage plan set by the customer or the developer. The developer and the customer can be alleviated of contacting a carrier and setting up a new carrier subscription. The system and method can additionally enable highly customizable usage plans. Some IoT products use very little data, and a data plan could be assigned to that device accordingly through the system and method.

The system and method could alternatively be used for other use cases. The examples described herein are to provide illustrative scenarios that leverage some possible capabilities of different implementations of the system and method.

2. System for Programmatic Device Connectivity

As shown in FIG. 1, a system for programmatic device connectivity can include a communication platform 110, at least one connectivity device 120, and a mobile core 130.

The communication platform 110 is preferably a multi-tenant service platform. The communication platform 110 can enable multiple distinct accounts, sub-accounts, or other entities to utilize the platform independently. Generally, the accounts using the communication platform 110 will be implementing some functionality that will serve a plurality of end users. For example, a business may create an account within the communication platform 110 so that they can use the programmable device connectivity features as an IT solution for the employees of the company. In another example, an IoT device company may use the communication platform 110 to provide the connectivity to their devices. In a preferred implementation, the communication platform 110 can facilitate a set of communication capabilities such as PSTN calls, IP/SIP based voice or video calls, SMS or MMS messaging, IP messaging, third party communication channel integrations, notifications, internet data communications, and/or other communication operations. The communication platform 110 can include an API service 112, an event callback system 114, and/or application logic processing system 116.

The API service 112 functions as a programmatic interface for managing and interacting with configuration and operational management of connectivity devices. The API service 112 is preferably a RESTful API but may alternatively be any suitable API such as SOAP or custom protocol. The RESTful API works according to an application layer request and response model. An application layer request and response model may use an HTTP-based protocol (HTTP or HTTPS), SPDY, or any suitable application layer protocol. Herein, HTTP may be used, but should not be interpreted as being limited to the HTTP protocol. HTTP requests (or any suitable request communication) to the communication platform no preferably observe the principles of a RESTful design. RESTful is understood in this document to describe a Representational State Transfer architecture as is known in the art. The RESTful HTTP requests are preferably stateless, thus each message communicated contains all necessary information for processing the request and generating a response. The API service 112 can include various resources, which can act as API endpoints that can act as a mechanism for specifying requested information or requesting particular actions. The resources can be expressed as URI's or resource paths. In one exemplary instance, a GET request (or other suitable method of an application layer protocol request) can be transmitted to a URI specifying a particular API resource. The response to the request can include properties of the specified resource. In another exemplary instance, a POST request (or other suitable method of an application layer request) can be transmitted to a URI specifying a particular resource. Properties of that request can initialize some action and/or change in data within the communication platform. Different resources can expose different channels to information and/or control of the communication platform and the managed connectivity devices. In one variation, the API service 112 can expose a device resource, device usage resource, a connectivity plan resource, a commands resource, and/or other resources used in programmatically managing and interacting with connectivity devices 120.

The device resource functions to represent a physical connectivity device capable of connecting to a wireless network. As described below, a physical connectivity device is preferably a SIM card used by a computing device in authenticating with a cellular network. An individual device resource is preferably created for each connectivity device 120. A device resource can have a number of properties that can be set and used to augment operation of an associated connectivity device.

The device resource will preferably include various identifying properties such as a unique identifier and/or a friendly name.

The device resource can additionally include a status property. The status property can indicate the current operating state of the associated connectivity device. The status will impact capabilities and metering of the connectivity device. In one variation, the different possible statuses can include "new", "ready", "active", "suspended", "deactivated", "canceled", "scheduled", and/or "updating". Other statuses could alternatively be used.

During a 'new' status, the connectivity device is waiting to be activated so that it can join the network. A connectivity device could exist in new status indefinitely at no charge. After transitioning to read or active, the connectivity status can preferably not return to new.

During a 'ready' status, the connectivity device can connect to the network and is capable of consuming network resources in accordance with its connectivity plan, but no monthly fee will be charged. Once the connectivity device has consumed some threshold of data (e.g., 250 KB of data) and/or some time window has passed (e.g., three months), the connectivity device can be transitioned automatically to active status. In one exemplary use case, a connectivity device could be set to a ready status when a manufacturer is shipping their product using connectivity device to a customer if the manufacturer is not sure when the device will begin active use.

During an 'active' status, the connectivity device can connect to the network and is preferably capable of consuming network resources in accordance with its connectivity plan.

During a 'suspended' status, the connectivity device can be blocked from connecting to the network.

During a 'deactivated' status, the connectivity device can be blocked from connecting to the network. After some time window (e.g., 72 hours), the connectivity device can be transitioned automatically to the terminal status canceled. This status can be used when a customer never wants the connectivity device to reconnect (for example a phone or IoT device has been lost or stolen).

A 'canceled' status can be a terminal status, and the connectivity device can be blocked from connecting to the network and can no longer be reactivated.

During a 'scheduled' status, an upstream network operator may be temporarily unable to update the status of this connectivity device. During this state, the connectivity device status will preferably be automatically updated to the requested status when the upstream network operator resumes accepting transactions.

During an 'updating' status, the connectivity device is in the process of being asynchronously updated. While the connectivity device is updating, it may not be possible to modify some fields. A status callback URI can be used during changes in status.

Some of the statuses will be read only, but some may be set or requested programmatically. Setting the status property of a device resource can be used as a mechanism for requesting a transition of the connectivity device to a new status. Exemplary mutable statuses can include the "ready", "active", "suspended", and "deactivated" statuses. Accordingly, the device resource can be used for activating, suspending, or deactivating a connectivity device through an API request to the appropriate device resource.

The device resource can additionally include a connectivity plan reference which functions to set a connectivity plan for the connectivity device. The connectivity plan reference is preferably a unique identifier of a connectivity plan resource.

The device resource can additionally include callback references that function to define actions or functionality that is invoked on different events. The callback references are preferably used in connection with the event callback system 114. The callback references are more preferably callback URIs (Universal Resource Identifier) such as a URL (Universal Resource Locator) to a webserver hosting application logic. There can be different types of callback references for different aspects of the connectivity device. Preferably, there is one that can be set for each mode of communication such as voice, messaging, and data. Different callback references may additionally be set for incoming versus outgoing or other suitable aspects of connectivity. There could be a voice callback URI, a messaging callback URI, a data callback URI, a command callback URI, and the like. The voice callback URI can be used for PSTN, SIP, or other forms of synchronous communications. The messaging callback URI can be for SMS, MMS, and/or IP messages. Additionally there could be a status callback URI that is used during changes in status of the connectivity device. A callback method property could additionally be set for each callback URI so that application layer protocol communications can use appropriate methods. For example, when using an HTTP-based protocol (e.g., HTTP/HTTPS), GET or POST can be specified for each callback reference.

The device usage resource can be used to programmatically access usage of the connectivity device as shown in the exemplary device usage resource of FIG. 2.

The connectivity plan resource functions to at least partially specify operational capabilities and permissions and also the metering and billing options of the connectivity device. The connectivity plan can include various properties that can be used to set capabilities of the connectivity devices. Capabilities such as data communications, SMS messages, MMS messages, PSTN calls, national roaming, international roaming and other capabilities could be enabled, disabled, capped/limited, and/or otherwise controlled. As one additional property, a billing mode could be set through the connectivity plan resource. A billing mode can set different ways in which connectivity devices are metered and/or billed. In a pooled billing mode all the usage of a connectivity devices associated with the connectivity plan are summed (i.e., pooled) when billing, evaluating progress against pricing tiers, evaluating usage limits, and/or assessing usage. In an individual billing mode, usage of connectivity devices associated with the connectivity plan are treated individually.

Alternative architectures of programmatic resources could alternatively be used. As an exemplary alternative, the connectivity plan could be directly specified within the device resource. As another exemplary alternative, the callback references and capabilities could be specified in the connectivity plan resource.

The API service 112 may additionally include a commands resource that can be used to create and access machine-to-machine communications. A command resource can be used for sending a data message to the connectivity device. In one implementation, message content can be transmitted through an SMS protocol. However, any suitable medium of communication or protocol could be used. The command resource can be used in delivering inbound communications. Outbound messages could be handled differently. As mentioned above, a device resource could specify a command callback, which would make an asynchronous application layer request to the command callback URI with outbound command or message communications.

The event callback system 114 can function to enable event triggers or webhooks to be activated in response to different state changes or events. Event callbacks may be triggered at particular stages of a communication. When an event callback condition is satisfied, a configured event is executed. The event could be an internal operation, a callback event, or any suitable action. An internal operation can be a closed action that may not be fully exposed to an account holder. A URI callback event preferably includes making an application layer protocol communication to an external resource located at the specified URI. A callback event may alternatively be configured by account for any suitable event such as when a connectivity device 120 is activated, when a communication associated with a device is received, or any suitable condition. Callback URIs may be setup to retrieve application logic to synchronously manage a communication.

The application logic processing system 116 may enable business logic to be defined through an executable document. Preferably, application logic is specified through a structured document. In one variation, a markup language document can be used in specifying a set of instructions and conditions that can be sequentially executed. The application logic may be retrieved from a remote server. For example, the event callback system 114 may retrieve application logic from a URI, which is then processed in association with a conversation. Application logic may alternatively be stored within the communication platform 110.

The connectivity device 120 functions as a connectivity destination or endpoint for communications. In a preferred implementation, the connectivity device of the system can be a SIM card or subscriber identity module card. The SIM card when used with a telecommunications module can authenticate a device as a subscriber and participant on a network. The connectivity device can be a SIM card, as one knowledgeable in the art would understand. The SIM card could include a unique serial number (e.g., integrated circuit card identifier (ICCID)), international mobile subscriber identity (IMSI) number, and/or other information such as service access credentials, PIN numbers, and the like. In one implementation, SIM cards can be distributed in combination with activation codes, wherein the activation codes can be communicated with the communication platform and used by the communication platform for altering the status of the connectivity devices. In other variations, the connectivity devices could be other types of devices such as phones, tablets, or other suitable devices. Such devices will preferably include a SIM card, integrated SIM data, or otherwise be capable of connecting to a network.

A mobile core 130 is the set of network infrastructure used in facilitating communications with the device. In one implementation, a network carrier with the mobile core 130 could be implementers of the system and can integrated the mobile core 130 with the communication platform. In an alternative implementation, the mobile core 130 can be enabled through an outside partner, and the system could include a mobile core 130 interface such that the communication platform 110 can interface with an outside mobile core 130. For example, the communication platform may interface with multiple carrier networks, where the devices have communications using the carrier networks as at least an intermediary resource for communications. Communications are preferably routed through the communication platform for at least a subset of communication types.

3. Method for Programmatic Device Connectivity

Figure 3:
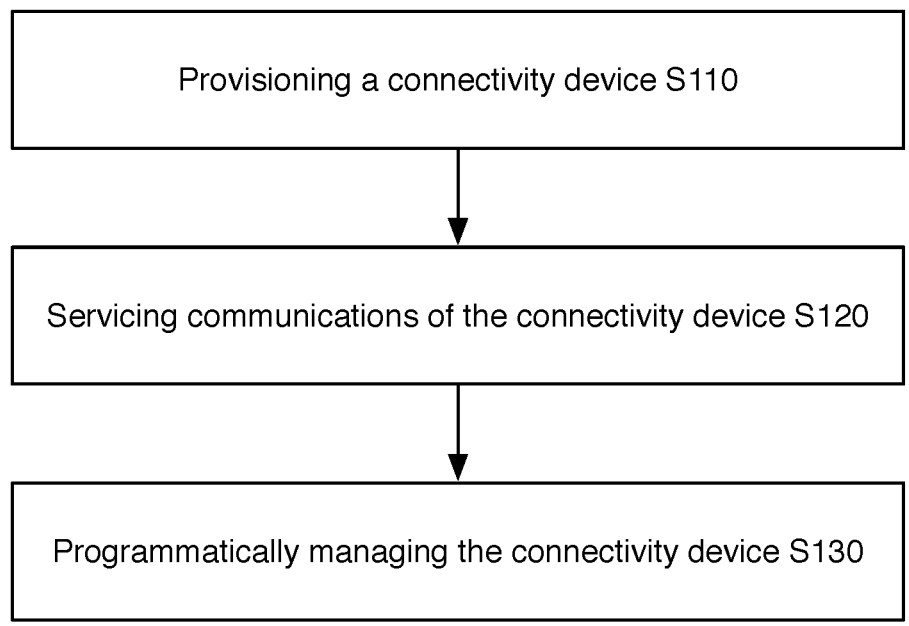
FIG. 3 is a flowchart representation of a method of a preferred embodiment.

As shown in FIG. 3, a method for programmatic device connectivity of a preferred embodiment can include provisioning a connectivity device S110, servicing communications of the connectivity device S120, and programmatically managing the connectivity device S130. The method preferably functions to enable connectivity devices to be activated, deactivated, and/or otherwise managed. Additionally, the management of the connectivity devices can be facilitated through an interface of a communication platform and, more preferably, a programmatic interface such as an API. The programmatic interfaces could be used in augmenting communications of the connectivity device. By exposing a programmatic interface to the management of connectivity devices, services and applications can provided automated management of cellular connectivity of one or more devices. The connectivity devices are preferably SIM cards or SIM-enabled devices that use a SIM card in enabling connectivity to a cellular network. The method is preferably implemented by a system such as the one described above, but any suitable system may alternatively be used.

The method can be particularly applicable to managing a plurality of connectivity devices, wherein provisioning servicing, and managing are applied across multiple connectivity devices. Subsets of the multiple connectivity devices could be individually configured with distinct connectivity plans and customized functionality. The method could similarly be applied to a single connectivity device.

Block S110, which includes provisioning a connectivity device, functions to enroll and setup data connectivity for a device. A connectivity device is preferably provisioned with an account of a communication platform. The communication platform can be one as described above and is preferably a multitenant communication platform such that distinct entities could independently provision connectivity devices through the communication platform. A connectivity device is preferably any device with capability to authenticate with a telecommunications network and participate as a subscribed entity. More specifically, provisioning a connectivity device can include provisioning a SIM card. A SIM card can enable identification of a computing device connecting to a network, and communications described in the method can be SIM card originated communications. In SIM card originated communications, the computing device transmitting and receiving telecommunication signals is identified as an endpoint as prescribed by the SIM card. In alternative implementations, the connectivity devices can be computing devices with included SIM cards or have digital equivalent of a SIM card. For example, a connectivity device may not have a removable SIM card but have identifiers and set within software or hardware of the device.

In one variation, provisioning can include providing connectivity devices, wherein the operator of the method can manage a known supply of connectivity devices. In providing connectivity devices, the communication platform can have a set of pre-registered connect devices (e.g., SIM cards) with known identifiers. In one implementation, a set of SIM cards can be issued by a carrier network to the communication platform, wherein the issued SIM cards are managed by the mobile core of the carrier network in a way compatible with the method. In this variation, only SIM cards provided by the communication platform are capable of operation with the method. Alternatively or additionally, ad-hoc registration of connectivity devices can enable outside connectivity devices to be migrated and enrolled for use with the method.

Providing connectivity devices can additionally relate to the physical transfer of the connectivity devices to an account holder. In one variation, the communication platform or other outlets could sell the connectivity devices. In another variation, the communication platform could expose a programmatic provisioning API that enables ordering of SIM cards. For example, an API can be exposed enabling an entity to order new SIM cards programmatically. An API request could specify the number, the SIM card type, and an address for SIM card delivery. In one variation, the SIM cards can arrive ready for use. Alternatively, a SIM card may be provisioned once the user has the SIM card in hand. This may be used to onboard SIM cards that a user already possesses.

Figure 4:
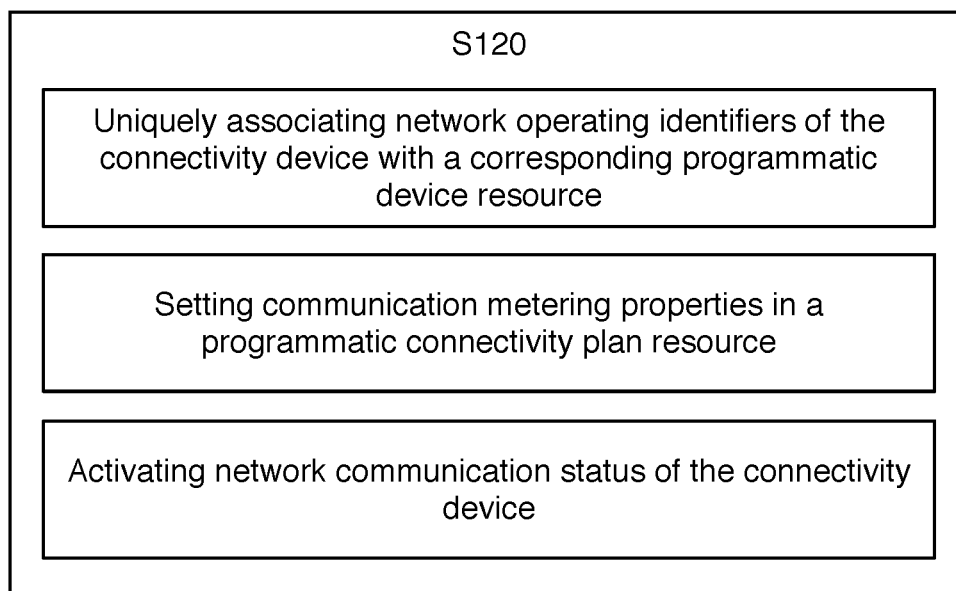
FIG. 4 is a flowchart representation of processes of provisioning a connectivity device.

Provisioning a connectivity device preferably includes uniquely associating network operating identifiers of the connectivity device with a corresponding programmatic device resource S122, setting communication metering properties in a programmatic connectivity plan resource S124; and activating network communication status of the connectivity device S126 as shown in FIG. 4. The processes of blocks S122, S124, and S126 function to setup a connectivity device and transition the connectivity device to an active state where communication and metering can be executed. The connectivity plan resource and the device resource are preferably programmatic resources exposed through an API of the communication platform. Setting and augmenting of programmatic resources can preferably be facilitated through block S130. Additionally, as with block S130, programmatic resources may additionally be set or changed through any suitable interface such as a user interface exposed on a control portal on a website or application of the communication platform.

Block S122, which includes uniquely associating network operating identifiers of the connectivity device with a corresponding programmatic device resource, functions to setup endpoint access and link identity of a connectivity device with an account. The device resource, along with other associated resources, can define state and settings of an associated connectivity device as shown in an exemplary API information request of FIG. 5. Preferably, the network operating identifier is one of a SIM card. The identifier for a SIM card could be an integrated circuit card identifier (ICCID). The international mobile subscriber identity (IMSI) and/or other network identifier may additionally or alternatively be associated with the device resource. In some variations, the SIM card can be associated with a phone number, which could additionally be associated with the device resource. In other variations, the phone number addressing can be provided through the communication platform. In this variation, a human facing endpoint address such as the phone number for the connectivity device can be set within the communication platform, wherein the actual device endpoint address can be transparent or a minor detail to the end user. The actual device endpoint address can be used internally, but a level of indirection is introduced so that a phone number is used to reference the device outside of the platform and mobile core, which functions to make device management more flexible. For example, the phone number used to access a device can be set and updated in real-time in block S130.

Block S124, which includes setting communication metering properties in a programmatic connectivity plan resource, functions to configure billing and/or usage limits for communications from connectivity devices. Preferably, the connectivity plan is abstracted away to its own programmatic resource in the communication platform. As discussed, the communication metering properties could additionally be properties of a device resource or represented in any suitable manner. In one variation, connectivity plan resources can be generated and then associated with a number of device resources. The act of associating a connectivity plan resource with a device resource, in one variation, can initialize or enable activation of the connectivity device. Prior to a device resource having a connectivity plan, the device is preferably restricted from activating.

The communication metering properties preferably relate to each available communication medium such as data usage, data machine-to-machine transmissions, SMS messages, MMS messages, PSTN voice calls, and/or other forms of communication. Additionally, the connectivity plan resource can define enabled capabilities and/or usage limits. Limits can relate to caps, tiered billing, rate limiting, and/or other forms of communication limits. Preferably, the metering properties will define the options used in measuring usage and generating a bill based on the measured usage. Setting communication metering properties in a programmatic connectivity plan resource can include setting communication metering modes, communication capabilities, communication limits, and/or other properties. These different properties may impact billing rates. Alternatively, billing rate properties can additionally be exposed for being defined.

The connectivity plan resource can expose different communication metering modes. The metering modes could be set by selecting from a set of offered metering modes such as a pooled mode and an individual mode. In a pooled mode, a usage from a set of devices can be measured and billed as a group. A pooled mode may be beneficial when there are a large number of devices, but each uses a small amount of data. In an individual mode, usage is measured on a per-device basis.

The connectivity plan may additionally include communication capability properties. A capability property can describe the network resources that a device is permitted to consume if they are available. For example, if a device is technically capable of roaming onto an international partner network, the capabilities property can define whether this is allowed and for which channels it is allowed. The capability property can include a set of different channels such as data, voice, messaging, commands, and/or other capabilities. Additionally each capability can be scoped to different areas of usage, which can include home usage, national-roaming, and international-roaming. Home scope enables connectivity on the home carrier network. National-roaming can enable roaming for carrier networks in the same country region. International-roaming can enable connecting through other carrier networks internationally. As one example shown in FIG. 6, a device may be permitted to roam using multiple channels on international networks but not other domestic networks, and the device may be prohibited from making machine-to-machine commands by defining a null command channel.

The connectivity plan may additionally include communication limits, which functions to enable restrictions to be placed on the volume of network resources consumed by the device. In one variation, a cap communication limit can be used to set an upper limit of usage. In a cap limit, an optional cap period may be used to automatically renew a cap. Caps can be placed for different channels such that voice, messaging, commands, and data may be individually limited. In one example shown in FIG. 7, a user may set a cap to limit a device to 50 MB of data and 30 minutes of voice calling per day, while allowing unlimited SMS messaging and commands. A cap property could additionally be used in setting finite, non-renewing usage limits. For, example, a device could be set so that it could only consume 2 GB of data over it's lifetime unless a new connectivity plan is created or if the device is deactivated and reactivated.

Block S126, which includes activating network communication status of the connectivity device, functions to enable a connectivity device for use with a network. Activating a connectivity device preferably involves some event that triggers transitioning a connectivity device from its current non-active state (e.g., a ready status, suspended status, etc.) to an active state. As shown in the exemplary scenario of FIG. 8, activating network communication status of the connectivity device can include receiving a programmatic request to activate the connectivity device and initiating activation of the connectivity device on the network. Activation on the network can take some amount of time that may prevent a readily available response to the activation request. Accordingly, the programmatic activation request can include a callback URI and/or a callback URI can be associated with connectivity device. For example, a status callback URI can be a property of the device resource. With a callback URI established, then activating the network communication status can additionally include transmitting an asynchronous status update on activation of the connectivity device to the status callback URI. The status callback URI can similarly be used for any status changes of a connectivity device. Preferably, an account will set the status callback URI to a managed URI such that a webserver of the account holder can detect status changes and take any appropriate actions.

Provisioning of the connectivity device will preferably include some registration process for associating a connectivity device and an account. In the variation, where the connectivity devices are provided by the communication platform, the network identifiers used for instructing a mobile core of how to interact with the connectivity devices can be established in the communication platform. A registration process can be used to map a convenient device identifier with the underlying identifier. Alternatively, the various network identifiers may be entered manually or looked up using some alternative mechanism.

In one variation, connectivity devices can be registered through a device identifier that accompanies a physical connectivity device. For example, a SIM card can be provided along with a uniquely associated activation code. The activation code can be used in registering and/or activating the SIM card. In this variation, provisioning the connectivity device can include providing SIM cards, where each SIM card is uniquely associated with a provided activation code; and receiving a registration request with a user-supplied activation code and generating the device resource. In this variation, the device resource characterizes configuration of the connectivity device identified through the user-supplied activation code. The network operating identifiers of the connectivity device can be searching for a connectivity device record with an associated activation code that corresponds to the user-supplied activation code. Setting of a connectivity plan resource and final activation can be completed once the connectivity device is registered with the account.

In another variation, connectivity devices can be preemptively associated with an account prior to the account holder having physical access to the connectivity devices. This can be used such that connectivity devices can be pre-registered and ready for activation upon receipt of the connectivity devices. This could be useful when an account holder has a use case where large volumes of connectivity devices will be used. This variation can include receiving an order for a connectivity device from the account of the communication platform, and, in association with fulfillment of the order of the connectivity devices, generating device resource accessible through a programmatic interface of the communication platform. Fulfillment of the order of the connectivity devices can mean the device resources are generated after confirming the order, during processing of the order, during shipment of the connectivity device, or at any point. In one variation, a placeholder device resource can be created immediately following an order of the connectivity device. Network operating identifiers could be associated with the device resource through registration facilitated by method operators. For example, the registration can be completed by the communication platform or a partner of the communication platform prior to shipment of the connectivity device. Alternatively, a device resource could be created after registration by the method operators. By pre-registering a connectivity device, an account holder could obtain faster access for configuring the connectivity devices for use. For example, once a device resource is established for the account, the account holder could begin setting a connectivity plan, requesting activation, or setting any operating properties of the device. Pre-registration can additionally lock the connectivity devices to use by that account, such that one would need access to the account to activate and/or use the connectivity devices.

As will be described below, the device resource and/or the connectivity plan resource can expose various operational options which can be used for introducing programmatic control of communications, custom communication rules like routing, and/or other features. These will be described in more detail in reference to block S130.

Block S120, which includes servicing communications of the connectivity device, functions to enable usage of the device. A mobile core is preferably used to facilitate the capabilities of a device. The SIM card is preferably used by a computing device such as a smart phone, computer, IoT device, or other suitable device in establishing network connection and sending/receiving communication. The device may be used for data downloading and uploading over the internet, SMS messaging, MMS messaging, IP messaging, voice calls, video calls, and/or other suitable channels of usage. Outbound and inbound communications can be made. Servicing communications preferably includes metering and measuring usage of the connectivity device. Metering can include measuring data usage, counting communications, counting time of synchronous communications, and/or creating a record of any suitable metric that may be used in limiting and/or billing of the usage.

In one variation, the communication platform can facilitate exposing programmable communications when servicing communications. Exposing programmable communications can enable application logic to be applied in connection with one or more channels of communication. A communication can be synchronously processed according to associated application logic. Synchronous application logic can enable a communication to be controlled in real-time. For example, a call could be rerouted automatically or a message could be translated before being sent to a destination. Communication can alternatively be asynchronously processed, wherein application logic is executed outside of the communication flow. For example, a developer may want to receive a notification each time an outgoing communication is made from the device so asynchronous application logic could be implemented to notify an application server of the developer without blocking or stalling the outgoing communication.

Programmable communication can involve setting a callback URI for a connectivity device. Callback URIs are preferably properties of associated device resources. There could be distinct callback URIs for different channels of communication such as a data command callback URI, a SMS/MMS callback URI, a voice callback URI, and/or any suitable type of callback URI. Fallback callback URIs could additionally be configured. At different events the callback URI is processed and used to retrieve application logic. The application logic can then be processed. A callback may be a synchronous callback or an asynchronous callback.

Figure 9:
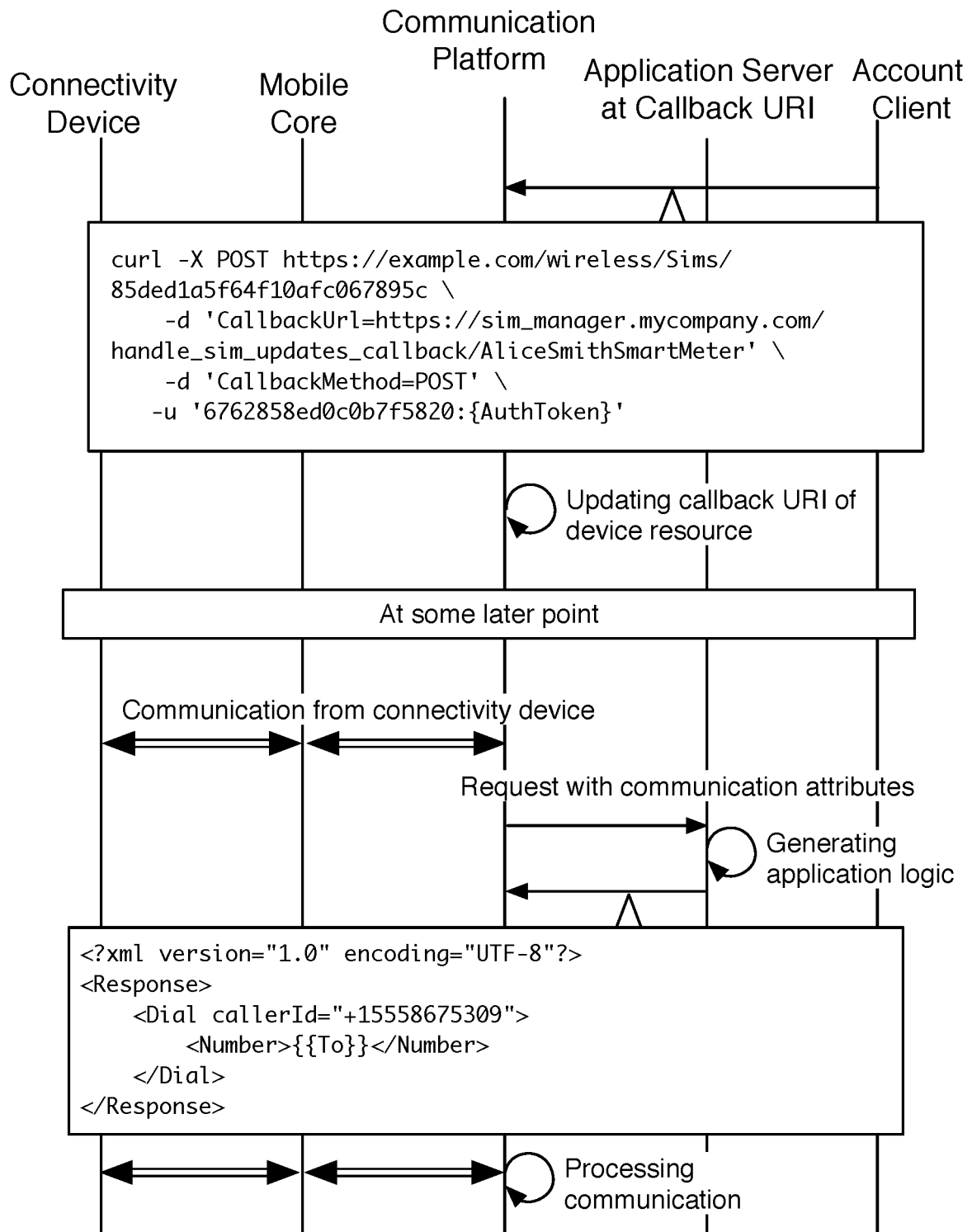
FIG. 9 is an exemplary communication flow diagram of offering programmable communications using a callback URI.

When accessing a callback URI, an application layer protocol can be used in a request response model to retrieve media that specifies actions to be taken within the communication platform as shown in FIG. 9. An application layer protocol is preferably an HTTP-based protocol like HTTP or HTTPS, but may alternatively be SPDY or any suitable protocol. An application layer request can be made to the configured callback URI. That callback URI will generally direct the request to a server controlled by the entity managing the device, and will perform any suitable processing task to determine the response. Communication attributes are preferably sent with the application layer request such that an application server processing the application layer request can generate a dynamic response. The communication attributes can include the connectivity device identifier, a communication destination identifier (e.g., the endpoint the communication was directed to by the device), communication type, communication payload, and/or any suitable properties. Then a response message is received at the communication platform. The response message can include a document with a set of instructions that can be sequentially processed and executed by the platform. The response message may alternatively include media, which may be used in the communication. Callback URIs can be used for outbound communications that originate from the connectivity device. Instances of outbound communications can include receiving a communication originating from the connectivity device at the communication platform; transmitting an application layer protocol transmission to the configured callback URI of the device resource; and receiving a response with application logic; and processing message according to the application logic. Communication attributes such as communication destination can be communicated in the application layer protocol transmission such that the server handling the callback URI can use the attributes in generating dynamic application logic. Inbound communications to the connectivity device or to an endpoint mapped to the connectivity device can similarly include receiving a communication from an external communication, the communication directed to an endpoint associated with a device resource within the communication platform; transmitting an application layer protocol transmission to a communication callback URI of the device resource; receiving a response with application logic; and processing the communication according to the application logic. The application logic can include various capabilities such as communication routing instructions, playing media files, performing text-to-speech, recording communications, establishing conferences, setting up a call waiting, receiving user input or other suitable functionality.

Other mechanisms for programmable communications may additionally or alternatively be used. In one variation, communication routing rules could be configured and associated with a device resource such that outbound and/or inbound communications could be dynamically modified in accordance with the routing rules. Servicing a communication can directing communications according to communication routing configuration of the device resource. These routing rules could be programmatically configured through an API or set in a user interface of an account accessed control portal. For example, a mapping of destination endpoints could be used for associating device-provided destination endpoints with executed endpoints. In this way, outbound communications from a device can be automatically mapped to a set destination. This could be used in preventing outbound communications with particular endpoints. The destination endpoint mapping could additionally include mapping destination endpoints to origin endpoints that are to be used when contacting a destination endpoint. The origin endpoints are preferably endpoints allocated to the account for usage. In one exemplary use case, a user could dial different phone numbers on a phone and the method could automatically direct communications to different phone numbers and automatically simulate the communications from originating from a dynamically selected phone number. In one example, a business could easily enable company-wide shortcodes for company managed devices. The short codes could be customized per connectivity device. For example, each customer could be enabled to dial '1' to reach their manager, '2' for their regional HR representative, '3' for regional IT support, and the like.

Routing rules could similarly be used for incoming calls. This can be particularly useful when a number of connectivity devices are being managed through the method. Inbound communications could be dynamically routed to appropriate connectivity devices.

The routing rule functionality could additionally or alternatively be implemented through application logic processing using the callback URI mechanism described above. An application server at a communication callback URI could render a response such as the one shown in FIG. 9, where the routing of the communication and/or mutation of the communication can be affected in any suitable manner. Highly customized logic could be used within the application server in determining the destination endpoint, the origin endpoint, and/or any other functionality in the application logic.

Figure 10:
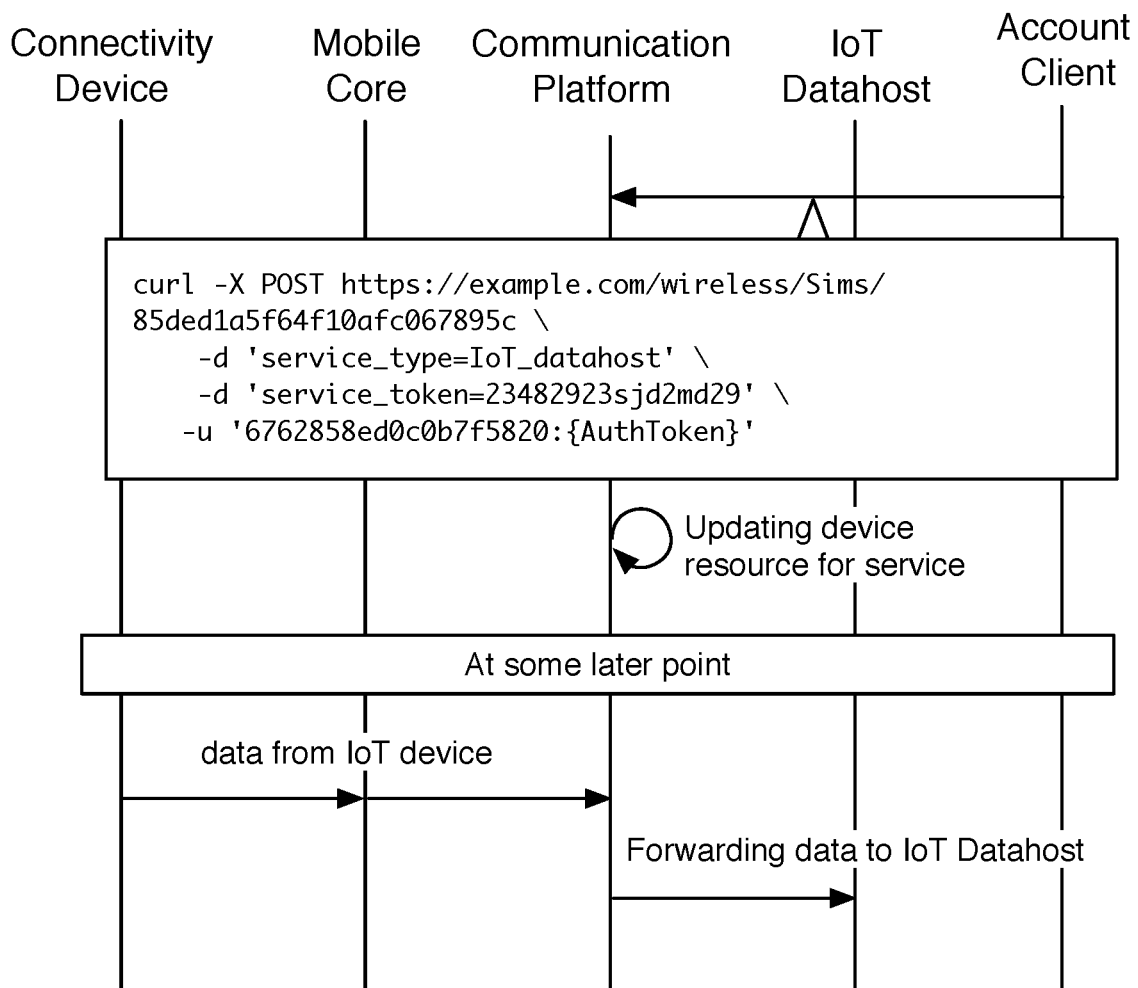
FIG. 10 is an exemplary communication flow diagram of forwarding communications to an outside service.

In a related variation to routing rules, the method could enable a device resource to be configured with communication-to-service routing, which can function to enable communications, in particular data messages, to be directly forwarded to an external host. Communication-to-service routing can be used in forwarding communications to an external database, data warehousing system, a cloud hosted data storage solution, and/or any suitable destination. This can be particularly applicable when the method is used by an account holder in managing connectivity of IoT devices. The IoT devices could be part of a sensor network using the network as a transport. This variation could be used in uploading data from the IoT devices to a particular destination. A communication-to-service routing variation can include: configuring credentials of an outside data destination service; receiving a data message originating from the connectivity device at the communication platform; and transmitting the data message to the configured data destination service using the configured credentials as shown in FIG. 10.

The method can additionally include enforcing policy when servicing communications. Enforcing policy can involve metering and billing for usage of a device. Devices are preferably metered according to the connectivity plan for the device. At the end of a billing period, a bill can be calculated and issued for the metered usage of one or more devices. Enforcing policy can additionally be used in restricting usage of the connectivity device. During new activity, the metered usage of the device (or device pool) can be compared to the caps in the connectivity plan to determine if the activity is permitted.

Block S130, which includes programmatically managing the connectivity device, functions to enable remote configuration of the connectivity device through an interface that can be integrated with other applications or services. The device resource and/or connectivity plan resource can be two programmatically-accessible resources through which operation and network connection of a connectivity device can be managed. As described above, callback URIs and application logic processing can be set through the device resource and/or connectivity plan resources to programmatically control or interact with communications. Preferably, properties of API resources such as the device resource and the connectivity plan resource can be read and/or updated to trigger changes. Additionally, a communication resource such as a command resource can be used for programmatically triggering communications originating and/or terminating at the connectivity device.

Additionally, the various configuration and activity of a connectivity device can be exposed through an interface. The interface can be a graphical user interface (e.g., a dashboard), wherein an administrator could review activity and make changes through a user interface. Alternatively or additionally, an API can be exposed and more specifically a REST API. Through API resources are preferably used to alter management of associated connectivity devices. An account holder could remotely augment the addressing of a connectivity device. For example, one or more endpoint may be routed to the connectivity device. The change in routing can be made in under a minute and may be changed multiple times. An account holder could alter callback URIs to update how event callbacks are triggered. The connectivity plan could be remotely altered to change billing and/or permissions.

The method may expose an interface for changing operating status of a connectivity device. This could be used to register, activate, suspend, deactivate, or set any suitable operating state. Registering preferably transitions a connectivity device to a ready state. Status changes can be set by an account holder through a user interface or a programmatic interface. In a programmatic interface, an API request can be submitted to an appropriate resource (e.g., the device resource) with a status property set to the newly desired status.

Figure 8:
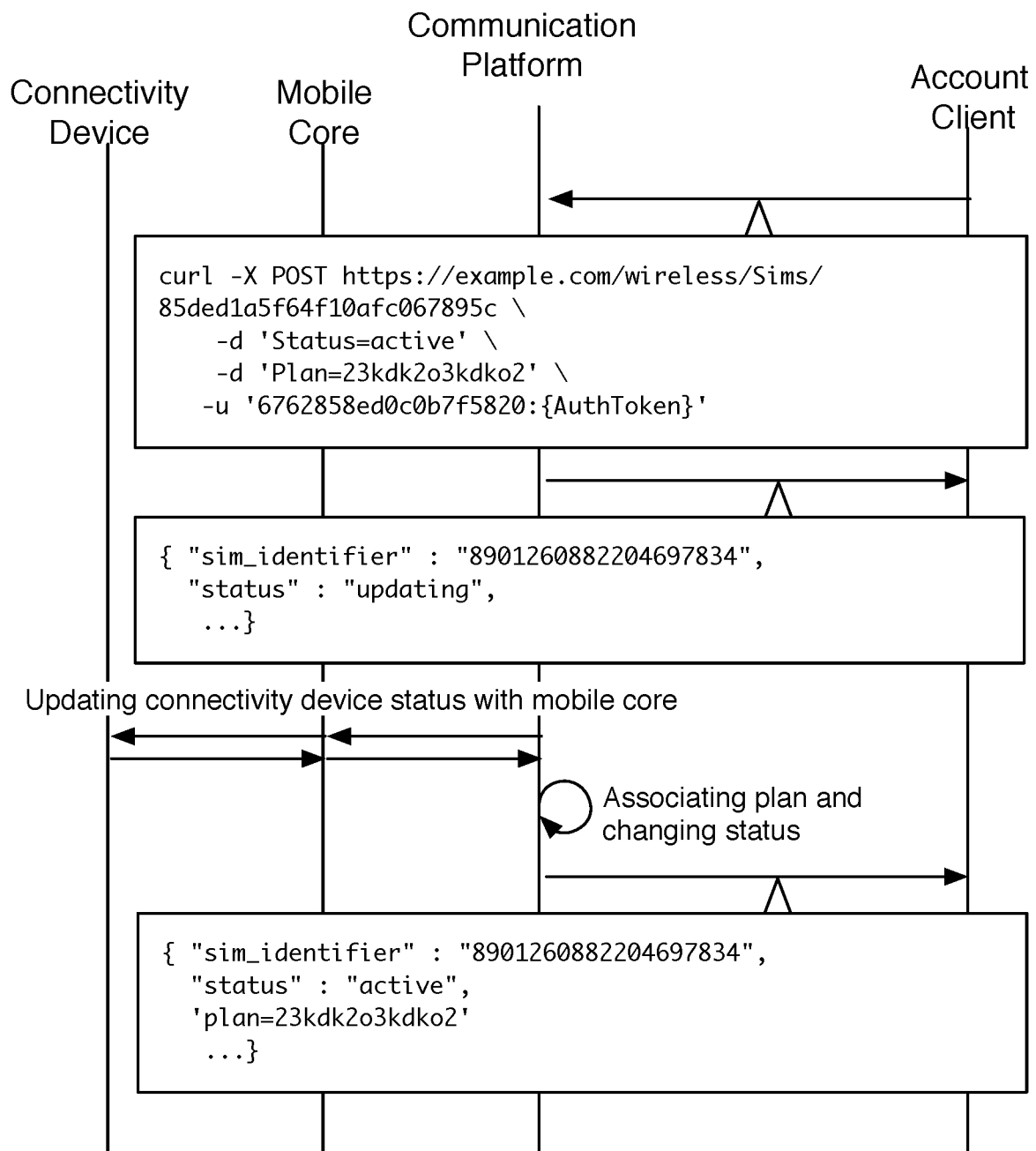
FIG. 8 is an exemplary communication flow diagram for activating a connectivity device.

In one variation, activating a connectivity device can include receiving a programmatic request to activate a connectivity device and initiating activation of the connectivity device on the network as shown in FIG. 8. As discussed above, a status callback URI could be configured for a device resource or otherwise specified in the request, wherein activating a connectivity device can include transmitting an asynchronous status update on activation of the SIM card to the status callback URI. Once a connectivity device is activated, the device can connect to the network and participate in communications. Additionally, metering and/or billing can be activated for the connectivity device. In some cases, a status update may fail in which case the status callback URI will receive a message indicating the update failure.

Figure 11:
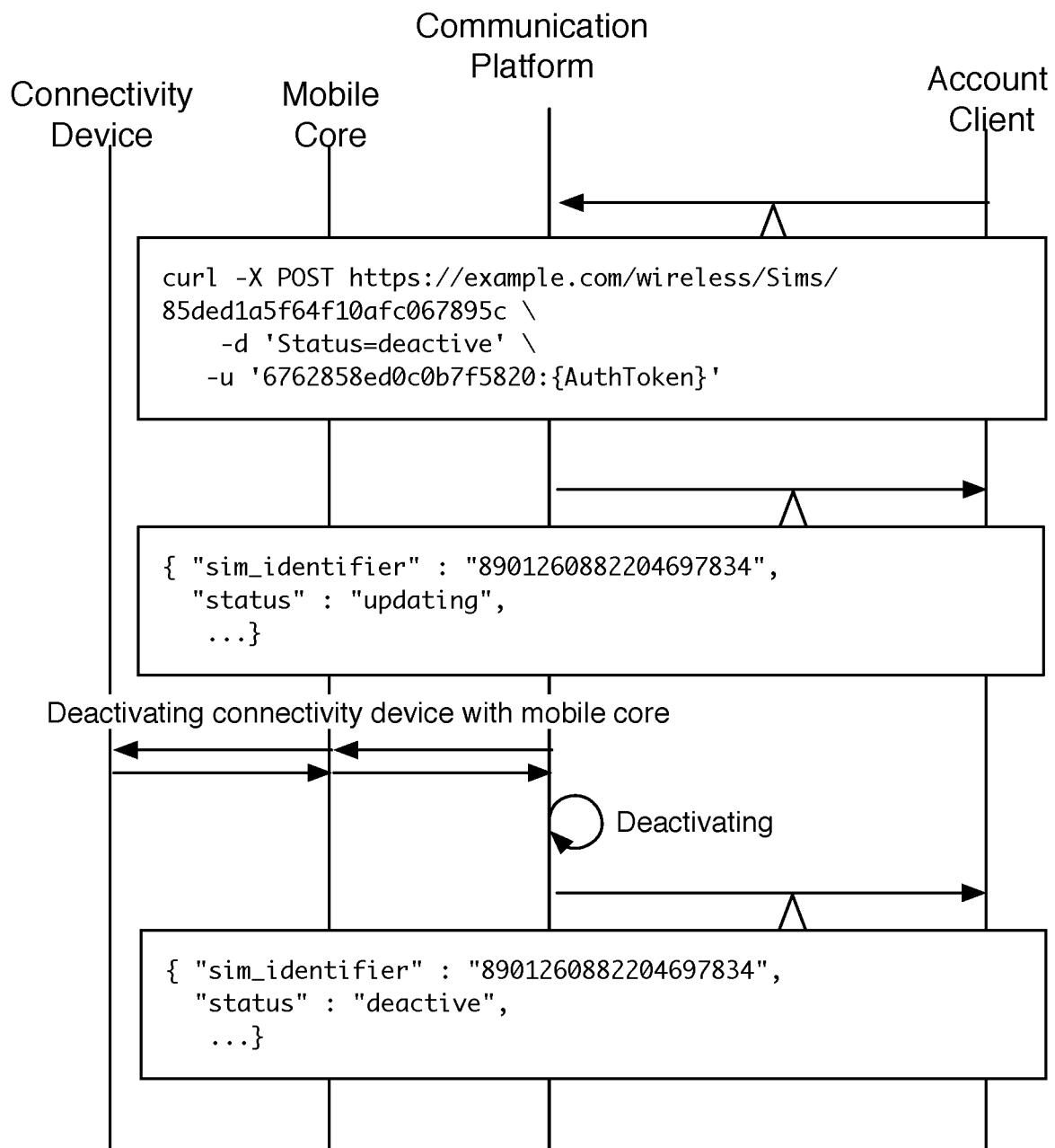
FIG. 11 is an exemplary communication flow diagram for deactivating a connectivity device.

In a related variation, deactivating a connectivity device can include receiving a programmatic request to deactivate a connectivity device and deactivating the connectivity device on the network as shown in FIG. 11. Deactivation preferably prevents communication and/or reactivation of the device. Suspending a device could be a similar process wherein the connectivity device could be reactivated.

During use of the connectivity device, the connectivity plan could be altered. Altering the connectivity plan can include receiving a programmatic request changing a current connectivity plan resource associated to the device resource to an updated connectivity plan and metering the connectivity device in accordance with the updated connectivity plan after changing the current connectivity plan. A connectivity plan could be changed by associating a new connectivity plan to the device resource. A connectivity plan could alternatively be changed by updating an existing connectivity plan resource associated with the device resource. As above, this could be facilitated through a user interface or a programmatic interface. As discussed above, a connectivity plan may enable changes to metering modes, enabled capabilities, usage limits, and/or other usage aspects. For example, the connectivity plan could specify a metering mode, an activation state of voice communication, an activation of message communication, an activation state of data connectivity, and a data limit.

In one variation, the method can expose a command API resource that is utilized for machine-to-machine communications. A command using SMS preferably issues commands in a text-based format and the content is arbitrary, wherein a developer can determine how the payload is used. Alternatively, MMS or alternative communication channels may be used to offer alternative payload formats. Commands, data communications, and/or other forms of communication can be initiated through a user interface and/or programmatic interface. Use of a command resource can include receiving a programmatic communication request to transmit data to a connectivity device and processing message transmission to the connectivity device. The communication request can specify the type of communication and the contents of the communication. The communication request can additionally include a status callback URI or the status callback URI may alternatively be specified in association with the device resource and/or connectivity plan. When a status callback URI is present transmission of a communication can additionally include transmitting an asynchronous status update on completion of processing message transmission. Preferably, the asynchronous status update will indicate successful transmission, but may alternatively indicate an error state or other outcomes of the attempted transmission.

The system and method of the preferred embodiment and variations thereof can be embodied and/or implemented at least in part as a machine configured to receive a computer-readable medium storing computer-readable instructions. The instructions are preferably executed by computer-executable components preferably integrated with the media intelligence platform. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

As a person skilled in the art will recognize from the previous detailed description and from the figures and claims, modifications and changes can be made to the preferred embodiments of the invention without departing from the scope of this invention defined in the following claims.

The invention claimed is:

1. A method comprising:
at a communications platform, registering a set of subscriber identity module (SIM) card connectivity devices with known identifiers and associating the set of SIM card connectivity devices to an account of the communications platform;
for each SIM card connectivity device of the set of SIM card connectivity devices, creating a programmatic resource and exposing a programmatic interface to the account;
receiving a request, which signals a request to activate a first SIM card connectivity device, via an application programming interface and authenticated by the account, the request specifying a programmatic resource of the first SIM card connectivity device and configuring a status callback universal resource identifier (URI); and
updating status of the first SIM card connectivity device in response to the request, which comprises initiating activation of the first SIM card connectivity device on a communications network and transmitting an asynchronous status update on activation of the first SIM card connectivity device to the status callback URI.

2. The method of claim 1, further comprising configuring an updated connectivity plan resource in association with the account, and wherein the request specifies the updated connectivity plan resource; wherein updating status of the first SIM card connectivity device comprises associating the updated connectivity plan to the device resource; and further comprising metering the first SIM card connectivity device in accordance with the updated connectivity plan.

3. The method of claim 2, wherein configuring the updated connectivity plan comprises configuring communication capabilities of the first SIM card connectivity device.

4. The method of claim 3, wherein configuring communication capabilities comprises setting an enabled state of messaging and an enabled state of voice communications.

5. The method of claim 3, wherein configuring communication capabilities comprises setting an enabled state of national roaming and an enabled state international roaming.

6. The method of claim 2, wherein configuring the updated connectivity plan comprises configuring communication limits.

7. The method of claim 6, wherein configuring communication limits comprises setting maximum number of message communications and maximum duration of voice communication.

8. The method of claim 1, wherein the set of SIM card connectivity devices are managed by a mobile core, and wherein updating status comprises communicating updated status of the first SIM card connectivity device with the mobile core.

9. A non-transitory computer-readable storage medium comprising computer-readable instructions that, when executed by one or more processors of a machine, cause the machine to perform operations comprising:
registering a set of subscriber identity module (SIM) card connectivity devices with known identifiers and associating the set of SIM card connectivity devices to an account of a communications platform;
for each SIM card connectivity device of the set of SIM card connectivity devices, creating a programmatic resource and exposing a programmatic interface to the account;
receiving a request, which signals a request to activate a first connectivity device, via an application programming interface and authenticated by the account, the request specifying a programmatic resource of the first SIM card connectivity device and configuring a status callback universal resource identifier (URI); and
updating status of the first SIM card connectivity device in response to the request, which comprises initiating activation of the first SIM card connectivity device on a communications network and transmitting an asynchronous status update on activation of the first SIM card connectivity device to the status callback URI.

10. The computer-readable storage medium of claim 9, further comprising configuring an updated connectivity plan resource in association with the account, and wherein the request specifies the updated connectivity plan resource; wherein updating status of the first SIM card connectivity device comprises associating the updated connectivity plan to the device resource; and further comprising metering the first SIM card connectivity device in accordance with the updated connectivity plan.

11. The computer-readable storage medium of claim 10, wherein configuring the updated connectivity plan comprises configuring communication capabilities of the first SIM card connectivity device.

12. The computer-readable storage medium of claim 10, wherein configuring the updated connectivity plan comprises configuring communication limits.

13. A system comprising:
a communications platform;
a set of subscriber identity module (SIM) card connectivity devices registered with known identifiers with the communications platform, wherein the set of SIM card connectivity devices are associated with an account of the communications platform;
a programmatic resource for each SIM card connectivity device of the set of SIM card connectivity devices;
a programmatic interface exposed to the account;
wherein the communication platform comprises at least one computer-readable medium storing instructions that when executed by at least one computer processor cause the communication platform to perform operations comprising:
receiving a request, which signals a request to activate a first SIM card connectivity device, via an application programming interface and authenticated by the account, the request specifying a programmatic resource of the first SIM card connectivity device and configuring a status callback universal resource identifier (URI), and
updating status of the first SIM card connectivity device in response to the request, which comprises initiating activation of the first SIM card connectivity device on a communications network and transmitting an asynchronous status update on activation of the first SIM card connectivity device to the status callback URI.

14. The system of claim 13, wherein the at least one computer-readable medium further stores instructions that when executed by at least one computer processor cause the communication platform to perform operations comprising configuring an updated connectivity plan resource in association with the account, wherein the request specifies the updated connectivity plan resource, where updating status of the first SIM card connectivity device comprises associating the updated connectivity plan to the device resource, and metering the first SIM card connectivity device in accordance with the updated connectivity plan.

15. The system of claim 14, wherein configuring the updated connectivity plan comprises configuring communication capabilities of the first SIM card connectivity device.

16. The system of claim 14, wherein configuring the updated connectivity plan comprises configuring communication limits.

* * * * *